(12) United States Patent
Gargin

(10) Patent No.: US 7,505,516 B2
(45) Date of Patent: Mar. 17, 2009

(54) ULTRA WIDE BAND (UWB) SYNCHRONISATION SEARCH

(75) Inventor: Douglas John Gargin, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 705 days.

(21) Appl. No.: 11/024,301

(22) Filed: Dec. 29, 2004

(65) Prior Publication Data

US 2005/0185697 A1     Aug. 25, 2005

(30) Foreign Application Priority Data

Feb. 3, 2004    (GB) ................................. 0402345.3

(51) Int. Cl.
*H03K 7/08* (2006.01)

(52) U.S. Cl. ........................ 375/238; 370/212; 332/109; 375/354

(58) Field of Classification Search .................. 375/238, 375/239, 138; 370/212, 213; 332/109, 112
See application file for complete search history.

(56) References Cited

U.S. PATENT DOCUMENTS

| | | | |
|---|---|---|---|
| 5,577,025 | A | 11/1996 | Skinner et al. |
| 6,671,310 | B1 | 12/2003 | Richards et al. |
| 2002/0018514 | A1 | 2/2002 | Haynes et al. |
| 2003/0147480 | A1 | 8/2003 | Richards et al. |
| 2004/0136439 | A1 * | 7/2004 | Dewberry et al. ........... 375/130 |
| 2006/0140249 | A1 * | 6/2006 | Kohno ........................ 375/130 |

FOREIGN PATENT DOCUMENTS

| | | |
|---|---|---|
| EP | 1 191 704 A3 | 3/2002 |
| EP | 1 460 773 A1 | 9/2004 |
| GB | 2 360 426 A | 9/2001 |
| WO | WO 98/39882 | 9/1998 |
| WO | WO 01/73712 A3 | 10/2001 |
| WO | WO 01/93444 A1 | 12/2001 |
| WO | WO 02/084969 A1 | 10/2002 |

OTHER PUBLICATIONS

C. Carbonelli, et al., "Synchronization and Channel Estimation for UWB Signals", GLOBECOM 2003, vol. 7 of 7, XP-010678168, Dec. 1, 2003, pp. 764-768.

(Continued)

*Primary Examiner*—Kevin Y Kim
(74) *Attorney, Agent, or Firm*—Oblon, Spivak, McClelland, Maier & Neustadt, P.C.

(57) ABSTRACT

An apparatus with ultra wide band (UWB) applications such as radar, position tracking and communications, for example Ground Penetrating Radar (GPR) and Wireless Personal Area Networking (WPANs). An apparatus synchronises a receiver to a received UWB signal having a known hopping code. The apparatus determines a parameter of the signal in a number of time slots; adds the parameter associated with each time slot to a number of corresponding of time and code offset accumulators; and determines the code and time offset accumulator having an accumulated value according to a predetermined accumulator metric as the code and time offset required to synchronise the receiver.

26 Claims, 15 Drawing Sheets

OTHER PUBLICATIONS

Yao Ma, et al., "Acquisition Performance of An Ultra Wide-band Communications System Over a Multiple-Access Fading Channel", 2002 IEEE Conference on Ultra Wideband Systems and Technologies, 2002, pp. 99-103.

C. Mueller, et al., "Spreading Properties of Time Hopping Codes in Ultra Wideband Systems", IEEE 7th International Symposium on Spread Spectrum Techniques and Applications, vol. 1, Sep. 2002, pp. 64-67.

I. Seskar, et al., "On Cross-Ambiguity Properties of Welch-Costas Arrays", IEEE Transactions on Aerospace and Electronic Systems, vol. 30, No. 4, Oct. 1994, pp. 1063-1071.

Leszek D. Wronski, et al., "Extended Hyperbolic Congruential Frequency Hop Code: Generation and Bounds for Cross- and Auto-Ambiguity Function", IEEE Transactions on Communications, vol. 44, No. 3, Mar. 1996, pp. 301-305.

* cited by examiner

| Code Index | 0 | 1 | 2 | 3 | 4 | 5 | 6 | 7 |
|---|---|---|---|---|---|---|---|---|
| Code Value | 1 | 5 | 4 | 7 | 6 | 3 | 0 | 2 |

Figure 16

Table 1

| | | $n_o$ | | | | | | | |
|---|---|---|---|---|---|---|---|---|---|
| | | 0 | 1 | 2 | 3 | 4 | 5 | 6 | 7 | ... |
| $\Delta$ | 0 | $p(\gamma_{0,6,0}) +$ $p(\gamma_{2,6,0}) +$ $p(\gamma_{4,6,0})$ | $p(\gamma_{0,5,0}) +$ $p(\gamma_{2,5,0}) +$ $p(\gamma_{4,5,0})$ | $p(\gamma_{0,4,0}) +$ $p(\gamma_{2,4,0}) +$ $p(\gamma_{4,4,0})$ | $p(\gamma_{0,3,0}) +$ $p(\gamma_{2,3,0}) +$ $p(\gamma_{4,3,0})$ | $p(\gamma_{0,2,0}) +$ $p(\gamma_{2,2,0}) +$ $p(\gamma_{4,2,0})$ | $p(\gamma_{0,1,0}) +$ $p(\gamma_{2,1,0}) +$ $p(\gamma_{4,1,0})$ | $p(\gamma_{0,0,0}) +$ $p(\gamma_{2,0,0}) +$ $p(\gamma_{4,0,0})$ | $p(\gamma_{0,7,0}) +$ $p(\gamma_{2,7,0}) +$ $p(\gamma_{4,7,0})$ |
| | 1 | $p(\gamma_{1,6,1}) +$ $p(\gamma_{3,6,1}) +$ $p(\gamma_{5,6,1})$ | $p(\gamma_{1,5,1}) +$ $p(\gamma_{3,5,1}) +$ $p(\gamma_{5,5,1})$ | $p(\gamma_{1,4,1}) +$ $p(\gamma_{3,4,1}) +$ $p(\gamma_{5,4,1})$ | $p(\gamma_{1,3,1}) +$ $p(\gamma_{3,3,1}) +$ $p(\gamma_{5,3,1})$ | $p(\gamma_{1,2,1}) +$ $p(\gamma_{3,2,1}) +$ $p(\gamma_{5,2,1})$ | $p(\gamma_{1,1,1}) +$ $p(\gamma_{3,1,1}) +$ $p(\gamma_{5,1,1})$ | $p(\gamma_{1,0,1}) +$ $p(\gamma_{3,0,1}) +$ $p(\gamma_{5,0,1})$ | $p(\gamma_{1,7,1}) +$ $p(\gamma_{3,7,1}) +$ $p(\gamma_{5,7,1})$ |
| | 2 | $p(\gamma_{0,3,0}) +$ $p(\gamma_{2,3,0}) +$ $p(\gamma_{4,3,0})$ | $p(\gamma_{0,2,0}) +$ $p(\gamma_{2,2,0}) +$ $p(\gamma_{4,3,0})$ | $p(\gamma_{0,1,0}) +$ $p(\gamma_{2,1,0}) +$ $p(\gamma_{4,1,0})$ | $p(\gamma_{0,0,0}) +$ $p(\gamma_{2,0,0}) +$ $p(\gamma_{4,0,0})$ | $p(\gamma_{0,7,0}) +$ $p(\gamma_{2,7,0}) +$ $p(\gamma_{4,7,0})$ | $p(\gamma_{0,6,0}) +$ $p(\gamma_{2,6,0}) +$ $p(\gamma_{4,6,0})$ | $p(\gamma_{0,5,0}) +$ $p(\gamma_{2,5,0}) +$ $p(\gamma_{4,5,0})$ | $p(\gamma_{0,4,0}) +$ $p(\gamma_{2,4,0}) +$ $p(\gamma_{4,4,0})$ |
| | 3 | $p(\gamma_{1,3,1}) +$ $p(\gamma_{3,3,1}) +$ $p(\gamma_{5,3,1})$ | $p(\gamma_{1,2,1}) +$ $p(\gamma_{3,2,1}) +$ $p(\gamma_{5,3,1})$ | $p(\gamma_{1,1,1}) +$ $p(\gamma_{3,1,1}) +$ $p(\gamma_{5,1,1})$ | $p(\gamma_{1,0,1}) +$ $p(\gamma_{3,0,1}) +$ $p(\gamma_{5,0,1})$ | $p(\gamma_{1,7,1}) +$ $p(\gamma_{3,7,1}) +$ $p(\gamma_{5,7,1})$ | $p(\gamma_{1,6,1}) +$ $p(\gamma_{3,6,1}) +$ $p(\gamma_{5,6,1})$ | $p(\gamma_{1,5,1}) +$ $p(\gamma_{3,5,1}) +$ $p(\gamma_{5,5,1})$ | $p(\gamma_{1,4,1}) +$ $p(\gamma_{3,4,1}) +$ $p(\gamma_{5,4,1})$ |
| | 4 | $p(\gamma_{0,4,0}) +$ $p(\gamma_{2,4,0}) +$ $p(\gamma_{4,4,0})$ | $p(\gamma_{0,3,0}) +$ $p(\gamma_{2,3,0}) +$ $p(\gamma_{4,3,0})$ | $p(\gamma_{0,2,0}) +$ $p(\gamma_{2,2,0}) +$ $p(\gamma_{4,2,0})$ | $p(\gamma_{0,1,0}) +$ $p(\gamma_{2,1,0}) +$ $p(\gamma_{4,1,0})$ | $p(\gamma_{0,0,0}) +$ $p(\gamma_{2,0,0}) +$ $p(\gamma_{4,0,0})$ | $p(\gamma_{0,7,0}) +$ $p(\gamma_{2,7,0}) +$ $p(\gamma_{4,7,0})$ | $p(\gamma_{0,6,0}) +$ $p(\gamma_{2,6,0}) +$ $p(\gamma_{4,6,0})$ | $p(\gamma_{0,5,0}) +$ $p(\gamma_{2,5,0}) +$ $p(\gamma_{4,5,0})$ |
| | ... | | | | | | | | |

| Code Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Code Value | 4 | 1 | 5 | 4 | 7 | 6 | 3 | 0 | 2 | 6 | 3 | 5 | 0 | 7 | 1 | 2 |

Figure 17

| Code Index | 0 | 1 | 2 | 3 | 4 | 5 | 6 | 7 |
|---|---|---|---|---|---|---|---|---|
| Code Value | 1 | 5 | 4 | 7 | 6 | 3 | 0 | 2 |

Figure 18

| Code Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Code Value | 2 | 0 | 2 | 0 | 1 | 3 | 2 | 3 | 1 | 0 | 3 | 0 | 2 | 1 | 2 | 3 |

Figure 19

| Code Index | 0 | 1 | 2 | 3 | 4 | 5 | 6 | 7 |
|---|---|---|---|---|---|---|---|---|
| Code Value | 7 | 4 | 1 | 6 | 3 | 0 | 5 | 2 |

Figure 20

| Template Generator Triggering Times Relative to the Start of a Frame (in ps) | | | | Bin Generator Output | | | |
|---|---|---|---|---|---|---|---|
| TG0 | TG1 | TG2 | TG3 | b0 | b1 | b2 | b3 |
| 0 | 62.5 | 125 | 187.5 | 0 | 1 | 2 | 3 |
| 250 | 312.5 | 375 | 437.5 | 4 | 5 | 6 | 7 |
| 500 | 562.5 | 625 | 687.5 | 8 | 9 | 10 | 11 |
| 750 | 812.5 | 875 | 937.5 | 12 | 13 | 14 | 15 |

Table 2

| Template Generator Triggering Times Relative to the Start of a Frame (in ps) | | | | Bin Generator Output | | | |
|---|---|---|---|---|---|---|---|
| TG0 | TG1 | TG2 | TG3 | b0 | b1 | b2 | b3 |
| 0 | 1000 | 62.5 | 1062.5 | 0 | 16 | 1 | 17 |
| 125 | 1125 | 187.5 | 1187.5 | 2 | 18 | 3 | 19 |
| 250 | 1250 | 321.5 | 1321.5 | 4 | 20 | 5 | 21 |
| 375 | 1375 | 437.5 | 1437.5 | 6 | 22 | 7 | 23 |
| 500 | 1500 | 562.5 | 1562.5 | 8 | 24 | 9 | 25 |
| 625 | 1625 | 687.5 | 1687.5 | 10 | 26 | 11 | 27 |
| 750 | 1750 | 812.5 | 1812.5 | 12 | 28 | 13 | 29 |
| 875 | 1875 | 937.5 | 1937.5 | 14 | 30 | 15 | 31 |

Table 3

ULTRA WIDE BAND (UWB) SYNCHRONISATION SEARCH

FIELD OF THE INVENTION

The present invention relates to ultra wide band (UWB) applications such as radar, position tracking and communications for example Ground Penetrating Radar (GPR) and Wireless Personal Area Networking (WPANs).

BACKGROUND OF THE INVENTION

A popular method for generating Ultra-Wideband (UWB) Signals uses a technique known as Impulse Radio (IR) as described in Moe Z. Win and Robert A. Scholtz, 'Impulse Radio: How it Works', IEEE Communications Letters, Vol. 2, No. 2, February 1998, and Moe Z. Win and Robert A. Scholtz, 'Ultra-Wide Bandwidth Time-Hopping Spread-Spectrum Impulse Radio for Wireless Multiple-Access Communications', IEEE Transactions on Communications, Vol. 48, No. 4, April 2000. This technique involves using a low duty cycle pseudo randomly time hopped pulse train of short (sub-nanosecond) mono-cycles to create a signal with an Ultra Wide-Band spectrum. In a UWB communications system the receiver needs to have an accurate idea of when the pulses will arrive in order to receive the signal correctly, i.e. the receiver has to be synchronised to the received pulse train.

The combination of the low duty cycle pulse train and the pseudo random time hopping code means that it can be difficult and time consuming to find the signal. One of the most reliable method of searching for the signal is to choose a time offset resolution which is smaller than the pulse and perform an exhaustive search for all time offsets and all hopping code offsets. However, this search takes the longest to perform and may not be suitable for some applications. Some searches which examine a subset of the search space and use a threshold technique have been proposed but these methods can exhibit low performance in certain scenarios and have a variable search time which can approach that of the exhaustive search in worst case situations.

Current technology employs a single Time-Integrating Correlator (TIC) as described in Burke, B. E.; Smythe, D. L.; 'A CCD time-integrating correlator', Solid-State Circuits, IEEE Journal of, Volume: 18 Issue: 6, December 1983 Page(s): 736-744. Typically the pulse train is found by triggering the TIC for all time and code offset combinations to perform an exhaustive search for the signal as described in Yao Ma; Chin, F.; Kannan, B.; Pasupathy, S.; 'Acquisition performance of an ultra wide-band communications system over a multiple-access fading channel', Ultra Wideband Systems and Technologies, 2002. Digest of Papers. 2002 IEEE Conference on, 2002 Page(s): 99-103. Some methods use a reduced search area combined with a threshold operation as described in Homier, E. A.; Scholtz, R. A.; 'Rapid acquisition of ultra-wideband signals in the dense multipath channel', Ultra Wideband Systems and Technologies, 2002. Digest of Papers. 2002 IEEE Conference on, 2002 Page(s): 105-109.

A system which aims to acquire fast acquisition of UWB IR time hopped sequences by ensuring that all absolute time differences between adjacent pulses is unique is described in Leanard S. Haynes and Mark D. Roberts, "Method and System for Fast Acquisition of Pulsed Signals", US Patent 2002/0018514, February 2002. However this method seems impractical in the presence of multi-path and multiple access interference. A simple way of reducing the amount of time taken to perform synchronisation is to not observe the code for its full length but to only observe a smaller subset as described in Larry W. Fullerton, "Fast locking mechanism for channelized ultrawide-band communications", U.S. Pat. No. 5,832,035, November 1998.

The problem with using an exhaustive search is that, although the performance is likely to be the best, the search times can become unacceptably high for some applications.

Some methods have been proposed to decrease the time by using a reduced search in combination with a threshold function. However, choosing the correct threshold for dynamic, and unknown, signal to noise ratio (SNR) and Multiple Access Interference (MAI) scenarios may be difficult which will compromise performance. Also these methods, although reducing the average search time, can exhibit high instantaneous search times (approaching that of the exhaustive search time) in worst case conditions.

Moe Z. Win and Robert A. Scholtz, "Impulse Radio: How It Works", IEEE Communications Letters, Vol. 2, No. 2, February 1998 describes impulse radio, a form of ultra-wide bandwidth (UWB) spread-spectrum signalling, that has properties that make it a viable candidate for short-range communications in dense multipath environments. This paper describes the characteristics of impulse radio using a modulation format that can be supported by currently available impulse signal technology and gives analytical estimates of its multiple-access capability under ideal multiple-access channel conditions.

Moe Z. Win and Robert A. Scholtz, "Ultra-Wide Bandwidth Time-Hopping Spread-Spectrum Impulse Radio for Wireless Multiple-Access Communications", IEEE Transactions on Communications, Vol. 48, No. 4, April 2000 describes attractive features of time-hopping spread-spectrum multiple-access systems employing impulse signal technology, and emerging design issues are described. Performance of such communications systems in terms of achievable transmission rate and multiple-access capability are estimated for both analog and digital data modulation formats under ideal multiple-access channel conditions.

Yao Ma; Chin, F.; Kannan, B.; Pasupathy, S.; "Acquisition Performance Of An Ultra Wide-Band Communications System Over A Multiple-Access Fading Channel", Ultra Wideband Systems and Technologies, 2002. Digest of Papers. 2002 IEEE Conference on, 2002 Page(s): 99-103 describes how ultra wide-band time-hopping communications are expected to be a practical scheme in the near future, however that the acquisition analysis of the UWB signals over multipath channels has not been adequately addressed.

Homier, E. A.; Scholtz, R. A.; "Rapid Acquisition of Ultra-Wideband Signals in the Dense Multipath Channel", Ultra Wideband Systems and Technologies, 2002. Digest of Papers. 2002 IEEE Conference on, 2002 Page(s): 105-109 describes efficient serial search strategies which are shown to reduce drastically the mean acquisition time for UWB signals in a dense multipath environment. Inherent in traditional serial search problems is the assumption that only a single bin or a small number of consecutive bins can properly terminate the search. This assumption leads to search strategies which tend to be linear in nature, e.g., a linear sweep of the uncertainty region. Because of the dense multipath channel present in most UWB systems, this assumption is invalid as seen by the channel's relatively large delay spread. A generalized analysis of various search algorithms is presented based on a Markov chain model of a simple single-dwell serial search. The results from this analysis reveal that the linear search has a considerably larger mean acquisition time than the more efficient search strategy termed the bit reversal search.

Burke, B. E.; Smythe, D. L.; "A CCD Time-Integrating Correlator", Solid-State Circuits, IEEE Journal of, Volume:

18 Issue: 6, December 1983 Page(s): 736-744 describes a CCD binary-analog time-integrating correlator that has been designed and operated at 20 MHz clock rate. The 32-channel device is capable of integration periods in excess of 25/spl mu/s or 500 clock periods, equivalent to a time-bandwidth product of 250. The device architecture is based on charge-domain signal processing for high-speed operation and does not required on-chip logic for storage of the binary reference. The device is tailored for weak signal applications, and a new charge skimming circuit has been devised which allows the small portion of the integrated charge containing the correlation function to be separated from the large register by tenfold. The correlator has a stationary pattern noise which can be eliminated with simple postprocessing, yielding a dynamic range of 67 dB.

Leanard S. Haynes and Mark D. Roberts, "Method and System for Fast Acquisition of Pulsed Signals", US Patent 2002/0018514, February 2002 describes a method and system for fast acquisition of pulsed radio signals where said signals comprised uniquely-spaced pulses or symbols. The receiver searches for and detects two ore more symbols, determines the interval or intervals between the symbols, and because the intervals are unique, the symbols or symbol sequences are identified. Identification of the symbols and their respective timing within the signal allows the receiver to adjust its timing to synchronize with the full signal.

Larry W. Fullerton, "Fast locking mechanism for channelized ultrawide-band communications", U.S. Pat. No. 5,832,035, November 1998 describes a receiver for acquisition and lock of an impulse radio signal comprising an adjustable time base to output a sliding periodic timing signal having an adjustable repetition rate, and a decode timing modulator to output a decode signal in response to the periodic timing signal. The impulse radio signal is cross correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by a one or more extra counts after each T pulses is reached in order to shift the PN code modulo for proper phase alignment of the periodic timing signal and the received impulse radio signal.

SUMMARY OF THE INVENTION

In general terms in one aspect the present invention provides a non-consecutive search and global maximum-selection and threshold crossing (MAX/TC) algorithm for the acquisition of a UWB signal over a multiple-access multipath fading channel. In one embodiment, correlator output statistics are analyzed in order to determine code and timing offsets of the receiver relative to the received signal, and provides acceptable robustness to multiple interferes, multi-path fading and noise. The method aims to decrease the search time when the absolute time reference (in terms of nominal pulse arrival time and code position) is unknown without significantly reducing the signal acquisition performance.

In particular in one aspect the present invention provides an apparatus for synchronizing a UWB receiving.

In particular in another aspect the present invention provides a method of synchronising a receiver to a received UWB signal comprising a series of pulses transmitted over a corresponding series of time frames, the relative position of the pulse in each transmitter time frame according to a time-hopping code; the method comprising: observing the signal; determining a parameter of the signal over a number of time slots corresponding to portions of the receivers time frame; for each determined parameter, adding said parameter to an accumulation of said parameters associated with said time slot each accumulation for the time slot corresponding to each possible signal frame offset and associated code value combination for said time slot; outputting estimated frame offset and code values having the highest accumulated parameter as the time frame offset and associated code values of the received signal compared with the receiver time frame.

For the purposes of this specification, a pulse here is a finite length waveform with zero or more zero crossings. This includes for example an impulse, a mono-cycle and a poly-cycle.

The parameter could be a representation of the observed signal, for example a snap-shot of a pulse received in the time slot. This is a capture of the received waveform for the duration of a pulse. This could take the form of an ADC and some memory to save the waveform. The snap shots could then be intergrated with the contents of the appropriate accumulations.

Preferably the parameter is the correlation of the observed signal and a locally generated template signal having a known waveform matching the expected (training or synchronising) signal from the transmitter; although being offset in time and/or code value from the transmitter signal. This saves the need for a set of samples to be stored per observation, and instead a single value (the correlation) only needs to be saved making it more efficient.

More preferably the template signal is merely the part of this signal at the time bin currently being correlated. Thus the parameter determining means comprises a template signal generator for providing a template signal at a second time offset, and means for correlating said template signal with said received signal in order to provide said parameter. Where the template signal is a pulse, this preferably corresponds to a pulse having a shape corresponding to a received pulse. In the embodiments, the second time will either correspond to a time bin position which the embodiment cycles through over a number of frames, or a time bin position corresponding to one of a number of suitably offset correlators; or a combination.

Preferably correlation is performed using a TIC which will produce a peak or high output if the template signal is a pulse corresponding with the received signal pulse. Each output of the TIC is added to previous TIC output results for the appropriate combinations of code offset and time offset which correspond to possible code and time offset combinations for the received signal. This will typically be achieved by using a memory location for each code and time offset combination, to which the correlation is added cumulatively. This requires less memory than the snap shot approach.

By adding the parameters of the signal to a number of signal frame offsets and code value combinations rather than just to one, the correct code and time offset combination will be found since the large parameter values (eg pulses or high correlations) will only sum coherently at the correct time and code offset combination. All the other locations will have a large parameter value (eg pulse) integrated into it once in a while, whereas the correct location will consistently be updated. This saves time by interpreting each correlator output in multiple ways, which reduces the search space, by relying on the coherent summation of received pulses at the correct code and time offset location.

As discussed above, known algorithms tend to run through each possible frame offset and code offset in order to determine which most closely matches the received signal. This is time consuming and therefore lengthens the receivers synchronisation time. Embodiments of the present invention recognise that each received signal pulse or mono-cycle could correspond to one of a number of frame and code offset combinations. Therefore, for each observed time offset, a parameter such as correlation with a locally generated signal is stored and accumulated for each of the possible frame and code offset combinations that the observed time offset could correspond to. After observing a given number of time offsets, the frame and code offset combination having the largest parameter accumulation is said to represent the best offset values for the receiver to operate with in receiving the traffic or data signals.

Preferably the integrating step comprises integrating the correlation at each said offset. This is easier to implement, however in an alternative implementation the correlation may only be added to the corresponding time and code offset combinations when it is the result of a coincidence of the received and generated pulse. This situation may be deemed to have occurred if the correlator output is above a certain threshold value for example.

In particular in another aspect the present invention provides a method of synchronising a receiver to a received UWB signal transmitted over a series of time frames each having a pulse, the relative position of the pulse in each transmitter time frame according to a code applied to the series of frames; the method comprising: observing the signal; determining a parameter of the signal over a number of time slots corresponding to a receiver time frame, the receiver time frame offset from said transmitted time frame by a frame offset value; for each determined parameter, adding said parameter to a plurality of accumulations of said parameters associated with said time slot, each said accumulation for the time slot corresponding to a number of different signal frame offset and associated code value combinations; outputting estimated frame offset and code values having the highest accumulated parameter as the time frame offset and associated code values of the received signal compared with the receiver time frame.

In particular in another aspect the present invention provides a method of synchronising a receiver to a received UWB signal comprising a series of pulses transmitted over a corresponding series of time frames, the relative position of the pulse in each transmitter time frame according to a time-hoping code applied to the series of frames; the method comprising: observing the signal; determining a parameter of the signal over a number of time slots; for each time slot, adding said parameter to a number of accumulations of said parameters associated with said time slot, each said accumulation for a possible receiver signal frame offset and associated code value offset combination corresponding to said time slot; outputting estimated receiver time frame offset and code offset values having the highest accumulated parameter as the receiver time frame offset and associated code offset values for the receiver compared with the observed signal.

Preferably the parameter is the correlation between the received signal and a corresponding signal locally generated according to the receiver time frame. This may be found using time-integrating correlators (TIC) for example.

In one embodiment there is a single TIC, such that a minimum of hardware is required. However a number of frames equal to the code length is the minimum theoretical length of time required for synchronisation. This does not include any time required for verification logic or the like. A second embodiment uses a higher number of TIC's, on per code, in order to speed up the synchronisation process, which can then be finished in one frame with suitable offsets for each TIC. Various intermediate possibilities could now alternatively be implemented by those skilled in the art.

In another aspect there is provided a method of synchronising a receiver to a received UWB signal comprising a series of pulses transmitted over a corresponding series of time frames, the relative position of the pulse in each transmitter time frame according to a time-hopping code; the method comprising: receiving the signal; generating a template signal corresponding to the received signal; correlating the received signal and the generated signal over a number of time offsets; determining corresponding code and time offset combinations for each said time offset; integrating the correlation at a said time offset with a value for each said corresponding code and time offset combination; determining the code and time offset combination having the highest accumulated value in order to synchronise the receiver.

There is also provided corresponding apparatus and computer software for implementing the methods defined in this specification.

BRIEF DESCRIPTION OF THE DRAWINGS

Embodiments are described with reference to the following drawings, by way of example only and without and without intending to be limiting, in which:

FIG. 16-19 are example codes;

FIG. 20 is an example of a bad code where the difference between adjacent codes is always 5;

Figure 23:
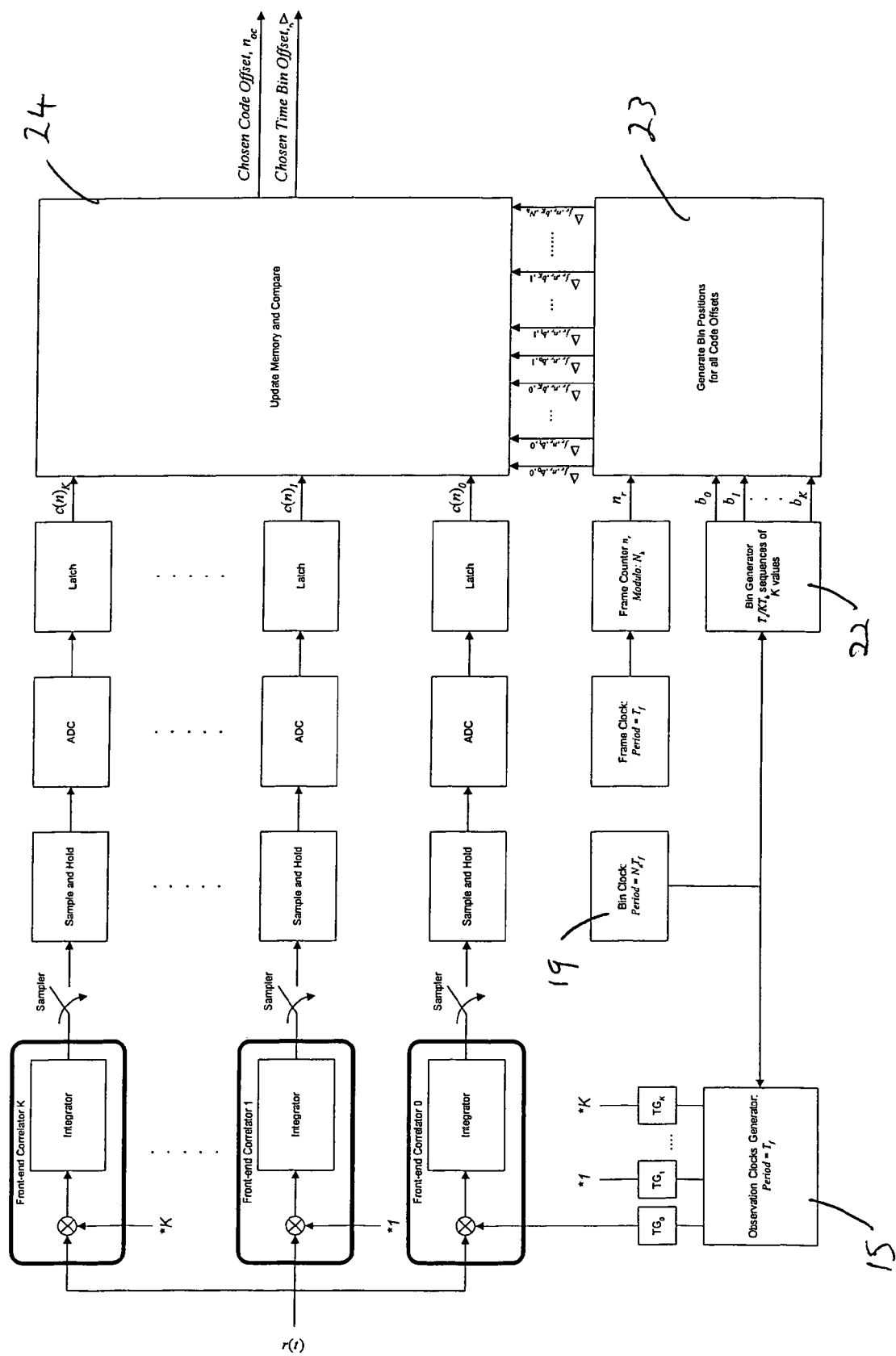
FIG. 23 shows an implementation architecture for scheme 1 and multiple correlators.
Figure 25:
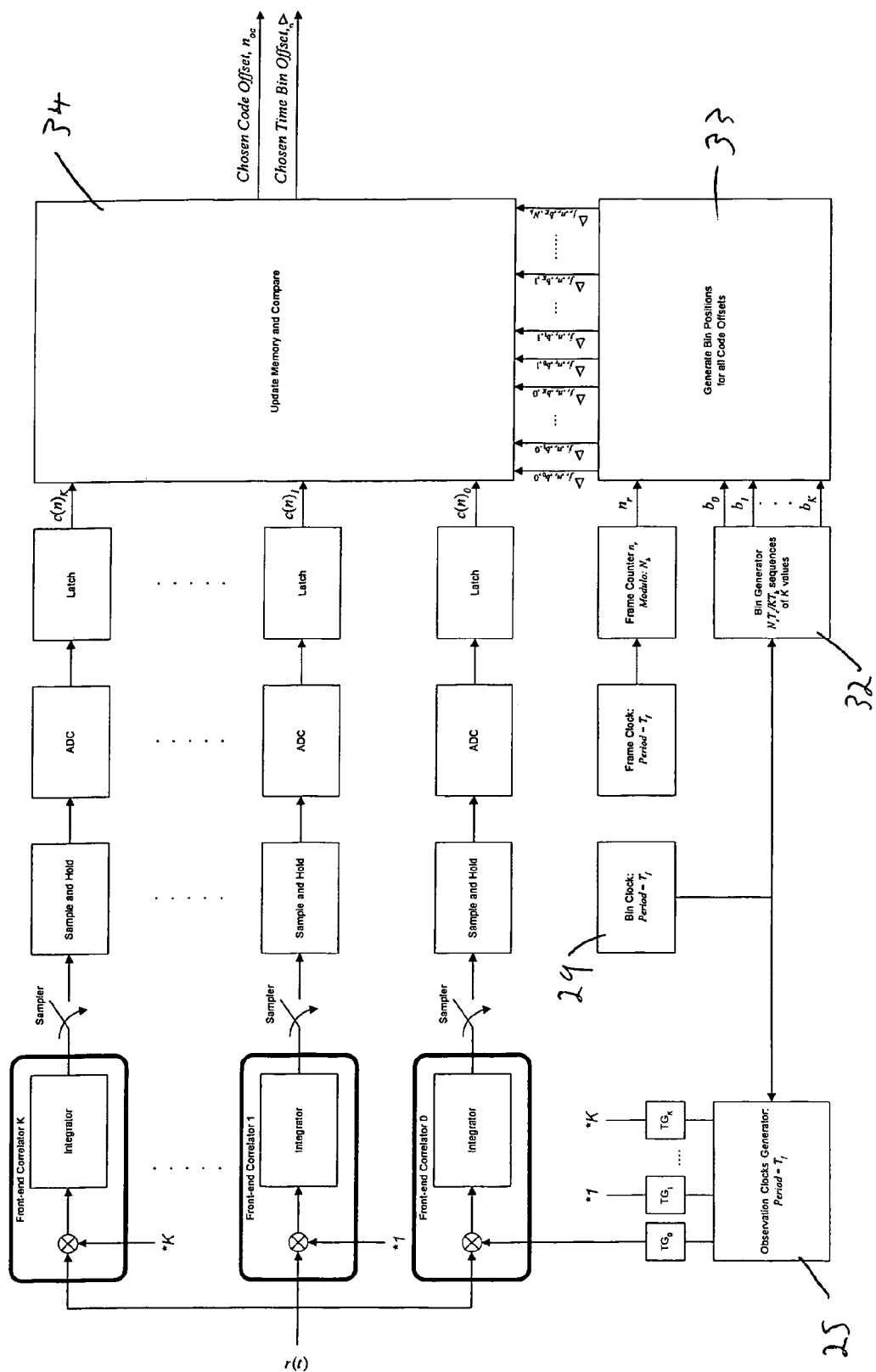
FIG. 25 shows an implementation architecture for scheme 2 and multiple correlators;.

Table 1 shows an example section of a Δ and $n_o$ table;

Table 2 shows the outputs of the observation clock generator and the bin generator of FIG. 23; and Table 3 shows the outputs of the observation clock generator and the bin generator of FIG. 25.

DETAILED DESCRIPTION

A UWB signal is a signal which has a fractional bandwidth greater than 0.25, or a signal which occupies 1.5 GHz or more of spectrum. The 1.5 GHz bandwidth floor only applies when the centre frequency is greater than 6 GHz. Fractional bandwidth, f is given by:

$$f = \frac{2(f_h - f_l)}{f_h + f_l}$$

where $f_h$ is the highest frequency limit in the signal below 10 dBs of the peak emission and $f_l$ is the lowest frequency limit in the signal below 10 dB of the peak emission.

The FCC allows UWB communication systems to use the frequency range 3.1-10.6 GHz with a minimum 500 MHz bandwidth and maximum emission values of −41 dB/MHz.

Figure 1:
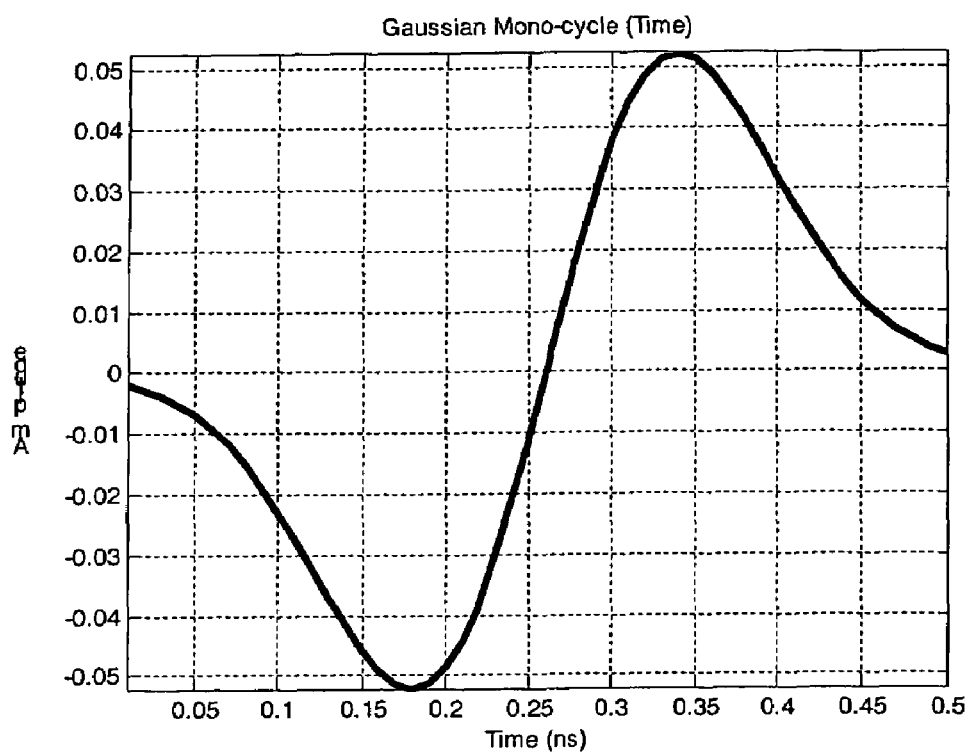
FIG. 1 shows a Gaussian mono-cycle in the domain.
Figure 2:
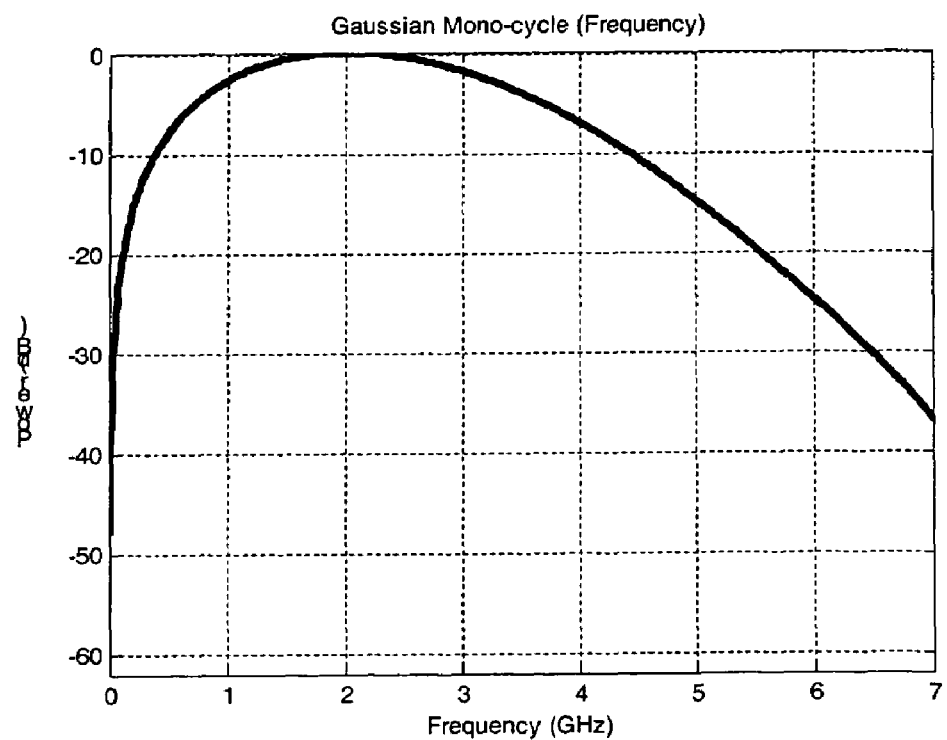
FIG. 2 shows a Gaussian mono-cycle in the frequency domain.

UWB IR techniques involve using short (sub-nanosecond) mono-cycle pulses to achieve an Ultra Wide-Band spectrum. FIGS. 1 and 2 show a Gaussian derivative mono-cycle in the time and frequency domains respectively. FIG. 2 shows that the single mono-cycle shown in FIG. 1 exhibits a fractional bandwidth of around 1.7 and is therefore a UWB signal.

Figure 3:
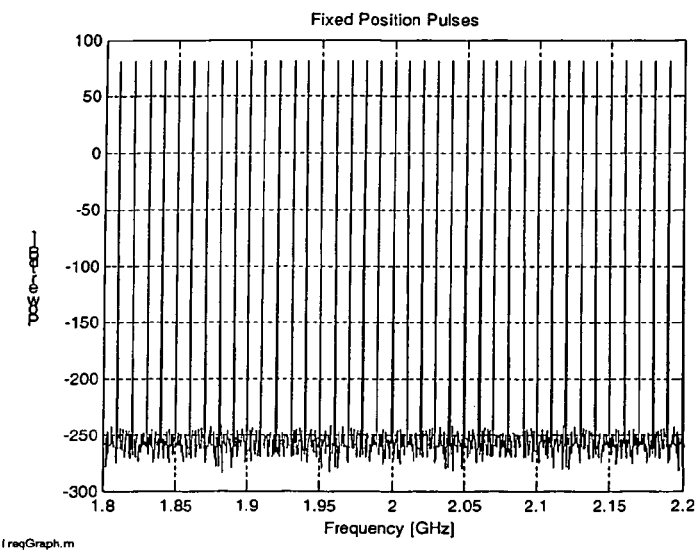
FIG. 3 shows the frequency spectrum of fixed interval Gaussian mono-cycle pulse train.

A signal pulse can produce a UWB spectrum but a single pulse is not useful in a communications system. UWB IR signals consist of a continuous train of mono-cycles repeated at a rate that is much greater than the duration of the mono-cycle, i.e. a low duty cycle is employed. For example a duty cycle of 1 in 200 is typical (e.g. 0.5 nanosecond pulse repeated every 100 ns). If a fixed pulse repetition is used, the spectrum of the signal contains high amplitude spikes at frequencies which are a multiple of the repetition rate, as shown in FIG. 3. Here the pulses are repeated every 100 ns giving spectral spikes every 10 MHz.

Figure 4:
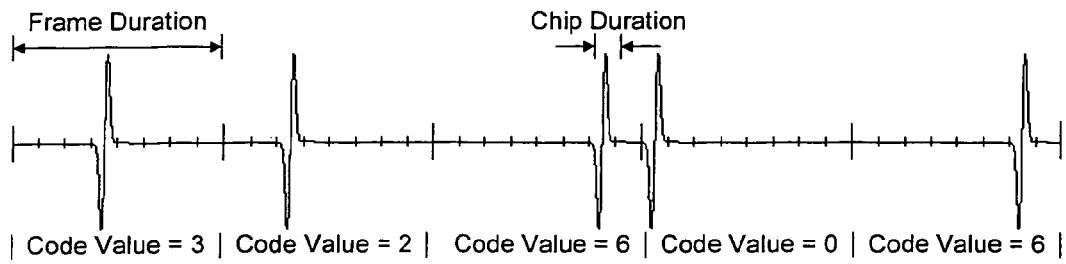
FIG. 4 shows an example UWB IR signal.
Figure 5:
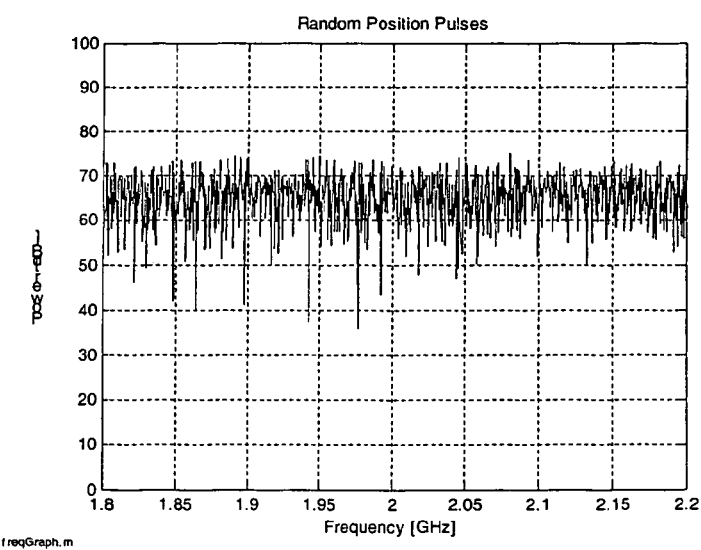
FIG. 5 shows the frequency spectrum of the pseudo random time hopping Gaussian mono-cycle hopping pulse train.

To avoid the spectral spikes which lower power efficiency by placing some out of the bandwidth, and also to provide a multiple access mechanism, a pseudo-random time delay is inserted in between each pulse. This is normally achieved by taking the nominal time between pulses of duration $T_f$, called the frame time, and splitting it into a number of $N_c$ sub divisions, called chips, of duration $T_c$. A pulse is transmitted during a randomly assigned chip duration for each frame. FIG. 4 shows a simplified version of a UWB IR signal. Note the fixed nominal time between pulses, the frame duration, the chip intervals and the pseudo random time hopping of the pulses. Note that the pulse duration is normally much shorter compared to the frame time and there are more chip intervals (e.g. 128, 256, 512, etc.) than shown in FIG. 4. The time hopping code is fixed in length to $N_h$ and continuously repeats during transmissions. The pseudo random hopping code helps to smooth out the signals frequency spectrum which makes it look more random (and hence is more power efficient), as shown in FIG. 5. Note that the greater the code length ($N_h$) is, and the greater the number of chips ($N_c$) there are, the better the multiple access performance and spectrum smoothing characteristics will be. Exemplary values for $T_f$ are in the region of 10 ns to 1 μs.

The pseudo hopped pulse train signal conveys no information. In order for it to bear information the signal needs to be modulated using user data. This can be carried out in a number of ways; bi-phase modulation, Pulse Position Modulation (PPM), On Off Keying (OOK) and so forth. Note that for the purpose of obtaining sync to a UWB IR signal the encoded data is unimportant and the following description assumes that the received pulses have not been affected by data modulation.

The receiver needs to know the pseudo random code, where the start of the frame occurs in time and which code value corresponds to which frame in the received signal (code offset) in order to receive the signal correctly. Obtaining frame and code offset timing is known as synchronisation.

Where UWB communication links are used for ad-hoc Wireless Personal Area Networks (WPANs), where connection life times may be in the order of seconds, fast acquisition of UWB timing is clearly desirable.

Figure 6:
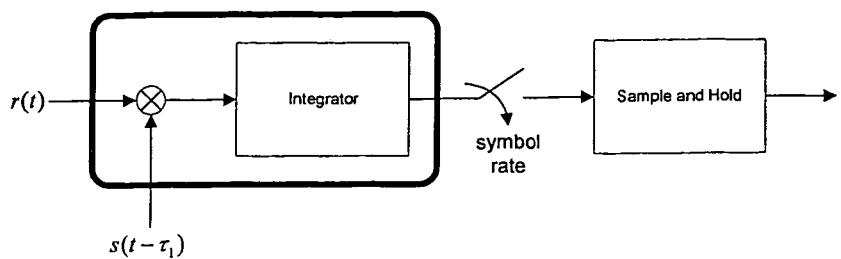
FIG. 6 illustrates a UWB IR front end correlator.

The UWB IR signal is detected by the "front end" of a receiver using a single Time Integrating Correlator (TIC), as shown in FIG. 6. The front-end performs a one-shot correlation operation by using a multiplier 1 and integrator 2 arrangement. The received signal r(t) is fed to the input of the multiplier 1 along with an internally generated version of the received pseudo-random pulse train $s(t-\tau_i)$. $\tau_i$ represents a variable that can be used to move the internally generated pulse train backwards and forwards in time in order to match the internally generated pulse train with the pulse train in the received signal. The internally generated pulse train needs to contain pulse shapes that are as close as possible to the received pulse shapes from the desired user and antenna characteristics may need to be taken into account. In order for the signal to be properly received, the generated pulse train also needs to be timed to coincide exactly with the received pulse trains pulse positions. If this is achieved a peak will appear at the output of the integrator each time a UWB IR pulse is received.

The output of the integrator 2 is sampled by a sampler 3, for example at the framerate. Note that multiple pulses can be used to represent one symbol, with an increased processing gain, and hence the output of the integrator may be sampled at a rate less than the frame rate. For UWB IR signals processing gain is defined as:

$$PG = \frac{T_s}{T_f} \qquad (1)$$

Where $T_f$ is the frame duration and $T_s$ is the symbol duration. Once the integrator 2 output is sampled, the integrators state must be reset to zero. The output of the sampler 3 may be held by a sample and hold circuit 4 for the duration of the symbol to allow the integration of multiple pulses, and hence processing gain, to be achieved.

If PPM is being used then a number of Time Integrating Correlators (1, 2, 3 and 4) are used, one for each pulse position in the modulation scheme. The only difference between the correlators is that the generated pulse train template is offset by a further (positive or negative) amount according to each pulse position in the modulation scheme. Here the correlator that outputs the highest peak value informs the receiver of the symbol being received.

The aim of UWB IR synchronisation is to determine the value $\tau_1$ such that the internally generated pulse train matches the received pulse train both in terms of time and code offset.

UWB IR synchronisation comprises of determining both frame and code synchronisation. Frame synchronisation is achieved by a receiver when it knows exactly where the start of the frame occurs in time (see FIG. 4). Code synchronisation is achieved by a receiver when it knows which code value corresponds to which frame in the received signal. To obtain a useful state of synchronisation both frame and code synchronisation need to be achieved. Frame and code synchronisation are usually obtained simultaneously.

When the receiver is switched on, it has its own arbitrary idea of where the start of the frame and the start of the code is. The receiver needs to synchronise its idea of where the frame and codes start with that of the signal being received. This can be achieved by attempting to receive the signal at various time shifts relative to the receivers frame time start. At each time shift all of the possible shifts in the code need to be examined to. If a particular time and code shift is correct, a peak should be detected at the output of the correlator. The receiver can receive the signal at each of the time and code shifts for a number of frame durations in order to integrate the received pulses and obtain a more reliable result. The time and code shift that produces the maximum value out of the correlator is most likely to correspond to the time and code shift modification that is required to be made to the receivers clock in order to receive the signal correctly.

Conceptually it is convenient to represent this process as a splitting of the receivers frame duration ($T_f$) into a number of time bins Nb. Every offset in the code, relative to the receivers current code position (arbitrary at switch on), is examined at each bin. Each time bin has a duration of $T_b$, making $N_b = T_f/T_b$ time bins in total. The number of observations required to perform the search is equal to $N_b \times N_h$ (recall that $N_h$ is the length of the hopping code). If the duration of a pulse is denoted by $T_w$ the condition $T_b < T_w$ has to be met in order to obtain a reasonable chance of matching the front-end correlator template on to the received pulses. The number of bins required, $N_b$, therefore depends on the frame duration, $T_f$, and the pulse duration, $T_w$. A $T_b$ of $T_w/4$ is an acceptable example.

Figure 7:
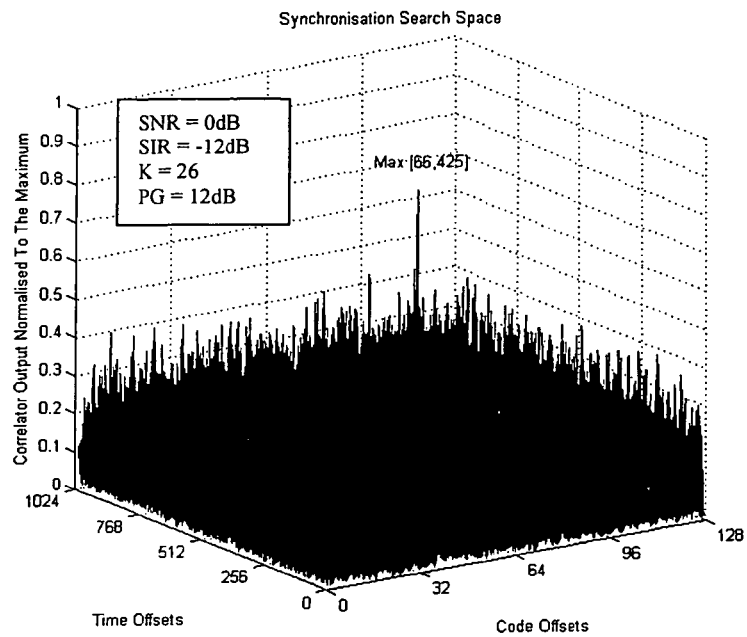
FIG. 7 shows a UWB IR sync search space.

FIG. 7 shows the search results for a UWB IR system using $T_f = 100$ ns, $N_h = 128$, $T_b = 97.7$ ps (giving $N_b = 1024$) and a processing gain (as defined above) of 16 (12 dB). There are 128 code offsets. It can be seen that the optimal time and code offset point is a single point in the search space. In this case a Signal to Noise Ratio (SNR) of 0 dB was used, a Signal to Interference Ratio (SIR) of –12 dB was used (with the number of users, K, being 26) and the Processing Gain (PG) was set to 12 dB. With a broad peak that straddled multiple time and code offsets it is possible to intelligently home in on the signal over the time and code offset space using the length of the multi-path channel. However this would be complex to implement and processor intensive.

Figure 8:
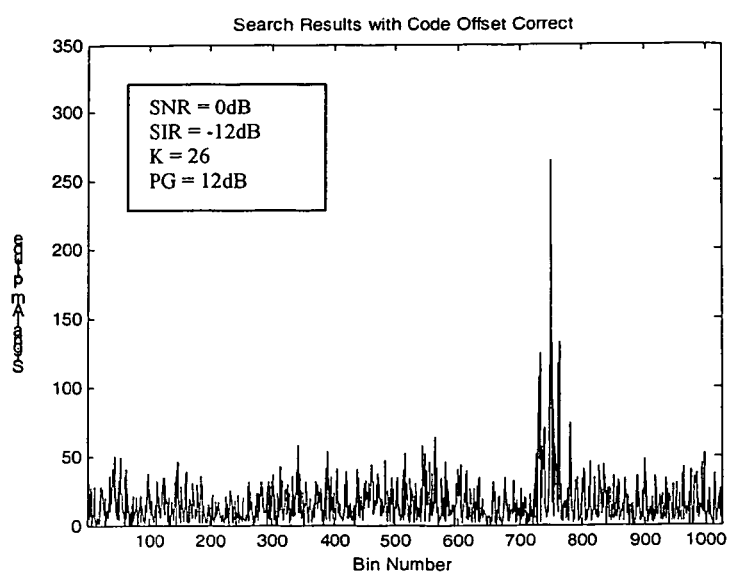
FIG. 8 shows example results when the code offset is correct.
Figure 9:
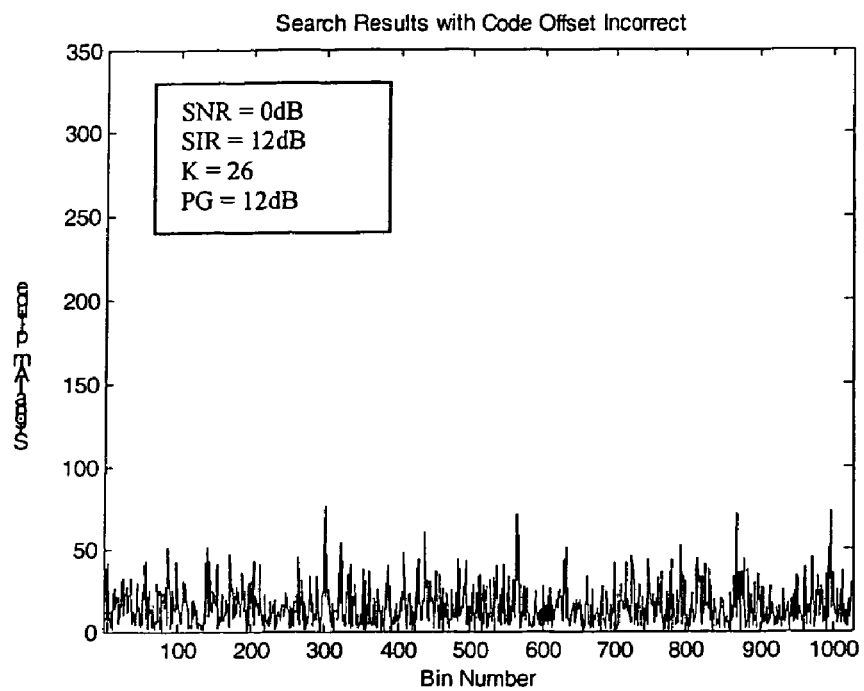
FIG. 9 shows example results when the code offset is incorrect.

FIG. 8 shows some results for all time bins that could occur when the code offset is correct. It shows that signal components occur within a block of time bins equal to the channel length. FIG. 9 shows a corresponding output when the code offset is incorrect. These results contain no signal components. It can be deduced that, in terms of reducing the number of observations made to perform the search, the reduction can only be made based on the knowledge of the block of signals within the time bins in the correct code offset scenario. No reduction in code offset observations can be made since it is correct in one case and incorrect in all others. The search space reducing techniques of the embodiment described use the block of signal components in the time domain.

Figure 10:
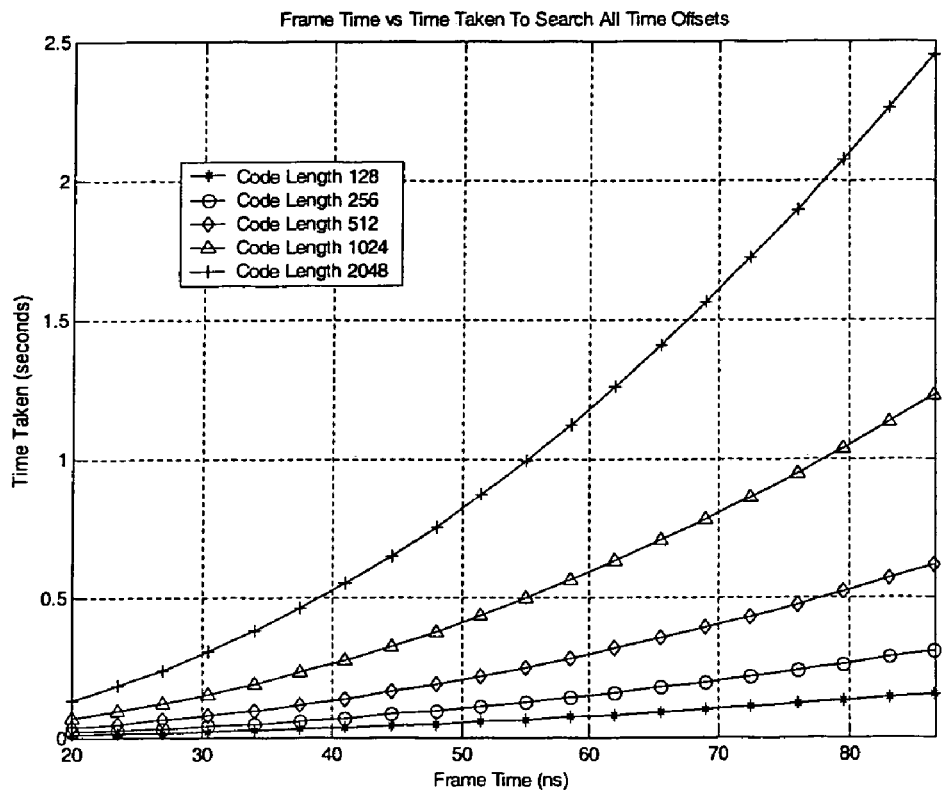
FIG. 10 shows a graph of frame time versus time taken to search all time offsets.

The time taken to perform the search is application dependant since it depends upon the frame time $T_f$, the code length $N_h$, the processing gain PG (the number of frames to integrate over) and the time bin resolution $T_b$. As an example, FIG. 10 shows the time required to perform an exhaustive search, in seconds, against the frame time $T_f$ in ns, for different code lengths ($N_h$) when using a processing gain (PG) of 16 (12 dB), a time bin resolution ($T_b$) of 0.1 ns, and only one observation is allowed per frame. Note that these times do not take into account any synch state machine in charge of signal verification and false alarm rejection. Indeed the final sync time is likely to be higher than the values shown since it may be necessary to search the space a number of times before successfully obtaining synchronisation.

The described embodiments search the search space faster by appreciating that a pulse observed at a particular instant in time could be present in this position in the received signal given a number of time bin and code offset combinations.

Figure 15:
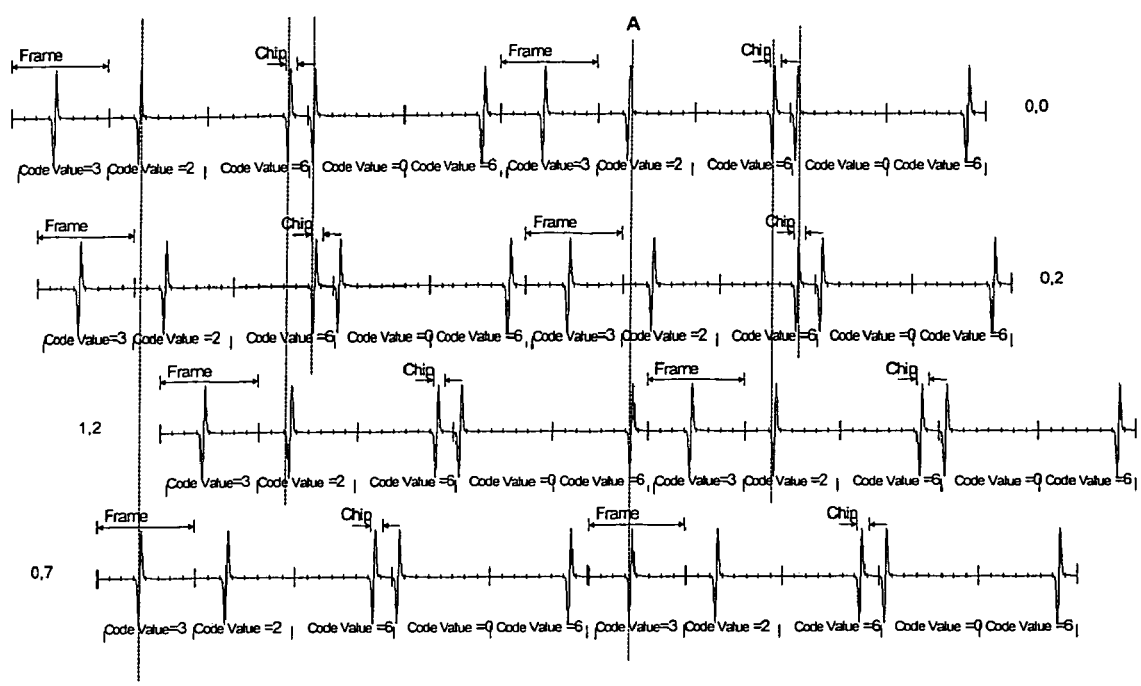
FIG. 15 illustrates an observation corresponding to a number of different time bin and code offset combinations.

FIG. 15 illustrates the principle and shows a number of super-frames of the expected UWB signal, but with various time bin and code offsets. The top super-frame corresponds to the receivers internally generated template signal which is compared with the incoming signal, and initially has code and time bin offsets of zero (0,0) with respect to an arbitrarily defined receiver starting time. If the incoming signal frame and and code offsets were synchronised to the receivers (arbitrary) frame and code offsets (0,0), then TIC output peaks would occur at each of the pulse positions shown in the generated super-frame (0,0). Each of these peaks would be added to the memory location corresponding to offset (0,0), and when combined would provide a large peak value. This large value will only occur when all of the pulses of the incoming and generated signal coincide, and will be detected as showing the code and time bin offset (0,0) required for synchronising the receiver's generated signal to the incoming signal. In practice however, it is unlikely that the receiver's arbitrary timing will correspond exactly with the incoming signal, and a receiver offset will need to be determined.

FIG. 15 shows four internally generated signals having the known super-frame structure with a pulse in each frame, the pulse position within each frame according to a code. There are four signals shown, each with a different code and time bin offset with respect to the internal receiver time—(0,0) which is not offset, (0,2) which has no code offset but an offset of two time bins, (1,2) which has a code offset of one and a time bin offset of two, and (0,7). The dashed vertical lines indicate TIC peaks, or pulse positions which correspond to an incoming signal pulse. Thus the first TIC pulse is at a pulse position which could correspond to the second pulse in the (0,0) local signal, or the first pulse in the (0,7) signal. Since the algorithm knows the hopping code structure it knows to add the TIC output pulse to the memory locations corresponding to these two offsets (0,0) and (0,7). Referring now to the TIC peak at A, it can be seen that this could correspond to three possible offset values: (0,0), (1,2), and (0,7). Although they correspond to different peaks in each of these offset local signals, the TIC output is added to the memory locations for each of these offsets. Of course only a small number of offset possibilities have been shown to illustrate the embodiment, and in practice each observation will map to $N_h$ (the hopping code length) time bin and code offset combinations. After a predetermined time or number of frames or super-frames, or after a memory location has exceed a particular threshold, the memory location having the highest value will be the offset at which to operate the receiver's time base in order to properly receive the UWB traffic or unknown signals.

In principle, the locally generated signal can be cycled through only the different time bins of a single frame, each of the time bin offsets corresponding to a number of code offsets having different time bin offsets. The example of FIG. 15 has 5 codes and 7 time bins per frame. Each time bin in the first frame of the receiver super-frame will correspond to a different time bin in another frame. More generally, each code and time bin offset (0,0) will correspond to a different time bin offset for each code—(1,6), (2,5), (3,4), (4,3). Thus the embodiment can search the 7×5=35 code and time bin offset search space in just 7 observations. This compares favourably with known solutions which cycle through all of the codes including all their time bins, which would require 35 observations. In a more practical example having 128 codes and 1024 time bins per code, the embodiment requires only 1024 observations compared with the 131072 observations of the above known system. This is an improvement in synchronisation time of over 100 fold.

Again in practice, it is likely that the embodiment will integrate the observations over a number of frames for increased accuracy, however as known systems also typically require this, the time saving advantage can still be seen to be significant.

Another way of looking at this is that each time bin offset (with respect to the receiver time) that we observe, were we to find a pulse there it would be the result of the transmitted signal transmitting at one of 5 (or 1023 in the above practical example) code and time bin offset combination values which point to possible adjustments that could be made to the receivers (arbitrary) bin and code offset values in order to align with the signal. Which one of these alignments (if any) is correct is initially unknown. However what we do know at this point is that if a pulse was found here (and was a result of the transmitted signal) one of these 5 hypotheses IS correct, or looking the other way the other 30 are definitely incorrect. The TIC outputs are added to the appropriate memory locations. If a pulse was present the TIC output will be significant and therefore the confidence in the 5 hypotheses will be strengthened. Next frame we observe at a different bin position, which produces another 5 (different) hypotheses and we can update another 5 (different) memory locations. So in 7 frames (or seven observations) we have covered the whole space. As we integrate the TIC outputs into our memory the TIC outputs due to received pulses will be added in to various places, however the pulses will only sum coherently at the correct bin and code offset. All the other locations will have a pulse integrated into it once in a while, whereas the correct location will consistently be updated. Therefore, choosing the maximum location at the end of the search will tell us what modification we need to make to the receivers idea of time in order for it to synchronise to the signal.

Whilst in the preferred arrangement the output of the TIC for each frame time bin is added to corresponding memory locations, over methods of incrementing these memory locations can be provided. For example only TIC outputs corresponding to a peak or correlation between the local and incoming pulses may be added to the memory locations; although for simplicity of implementation the TIC output of every time bin is added to the relevant memory locations. Alternatively a set increment may be added to the respective memory locations each time a TIC output pulse is detected.

In practice, the time bin $T_b<T_c$, the chip time, and as a rule of thumb $T_b<T_w/4$, where $T_w$ is the pulse duration. This is because $T_c>T_w$ and $T_b<T_w$.

A preferred algorithm is provided as follows. The receiver knows the pseudo random code and the frame duration $T_f$. It follows that the receiver can determine the code length $N_h$ and the chip duration $T_c$. The receiver can observe up to a time resolution of $T_b$ (time bit duration) and preferably where the pulse duration Tw divided by the time bit duration $T_b$ is $T_w/T_b>4$.

Also $$\frac{T_c}{T_b}$$

is a positive integer >0

A mathematical treatment of an embodiment is described as follows. A UWB IR signal with multiple users and multipath propagation can be defined by.

$$r(t) = \sum_{j=0}^{\infty} \sum_{k=1}^{K} \sqrt{P_k} \sum_{l=1}^{L} \sum_{n=0}^{N_h-1} \alpha_{k,l} \quad (2)$$
$$w(t - \tau_{k,l} - c_{k,n}T_c - (jN_h + n)T_f - d_k^{(j)} - \delta_k) + awgn(t)$$

w(t) represents the waveform of a single pulse in the received waveform.

n represents the index position into the pseudo random code, the code index, this shall be referred to as the frame number.

j represents the repetition number for the pseudo random code sequence, this shall be referred to as the super frame number. Note that equation (2) shows one symbol to be transmitted every super frame. This means that the number of pulses per symbol $N_s=N_h$. This is not a restriction but issue is not dealt with here without any loss of generality since it shall be assume that no data modulation is applied to the signal during synchronization.

K is the number of users, one of which will be the desired user.

L is the number of resolvable paths (assumed that same for every user)

$N_h$ is the pseudo random code length.

$T_c$ is the chip duration.

$T_f$ is the frame duration ($T_f>T_c$).

$P_k$ is the average power for the kth user.

$\alpha_{k,l}$ is the channel tap coefficient for the ith path of the kth user.

$\tau_{k,l}$ is the channel tap delay for the ith path of the kth user.

$c_{k,n}$ is the code value for the nth frame of the kth user.

$d_k^{(j)}$ is the delay value for the Pulse Position Modulation for the jth symbol for the kth user.

$\delta_k$ is delay equal to the difference between the start of the transmission for the kth user relative to the time the receiver is switched on. In theory $-\infty \leq \delta_k < +\infty$, however, it will be assumed that the transmitter has begun transmitting when the receiver is switched on, i.e. $-\infty \leq \delta_k \leq 0$.

awgn(t) represents Gaussian noise at the receiver.

When the receiver is switched on it will define its own arbitrary idea of time which will be relative to the switch on time. Furthermore, the receiver will maintain its own frame and super frame counts which shall be denoted by $n_r$ and $j_r$ respectively.

Assuming for the moment that no data modulation is present on the desired signal, and that no Multiple Access Interference, multi-path or noise is present, a simplified more manageable version of equation (2), is shown as equation (3).

$$r(t) = \sum_{j=0}^{\infty} \sum_{n=0}^{N_h-1} w(t - c_n T_c - (jN_h - n)T_f - \delta) \quad (3)$$

Note the complete removal of k and l. $\delta$ can be defined as:

$$\delta = (j_o N_h + n_o) T_f + \beta \quad (4)$$

where:

$j_o = j - j_r$ and
$n_o = n - n_r$
$n_o$ represents the frame or code offset, i.e. the difference between the frame number (or code position) of the received signal and the receiver.

$j_o$ represents the super frame offset, i.e. the difference between the super frame numbers of the received signal and the receiver.

$\beta$ represents an unknown additional time offset which can be any real number $0 \leq \beta < T_f$. Note that once the transmitter and receiver have been switched on $n_o$ and $j_o$ are constants.

Using the assumption that the receiver can observe up to a time resolution of $T_b$ $\beta$ can be approximated to:

$$\beta = \Delta T_b \quad (5)$$

where $\Delta$ is an integer $0 \leq \Delta < N_b$ and $T_b$ is the time bin duration ($T_b < T_c$). This approximation should not be too detrimental if $T_b < T_w$
So:

$$\delta = (j_o N_h + n_o) T_f + \Delta T_b \quad (6)$$

Equation (3) then becomes:

$$r(t) = \sum_{j=0}^{\infty} \sum_{n=0}^{N_h} w(t - c_n T_c - (jN_h - n - j_o N_h - n_o)T_f - \Delta T_b) \quad (7)$$

The values of n and $\Delta$ are unknown and it is the job of the synchronization algorithm to find them. It is known that n is an integer $0 \leq n < N_h$ and, using the approximation for $\delta$, $\Delta$ is an integer $0 \leq \Delta < N_b$. A more useful parameter for the receiver to know is $n_o$ which represents the change needed to the receivers frame counter $n_r$ so that it matches the value of n in the received signal.

Figure 11:
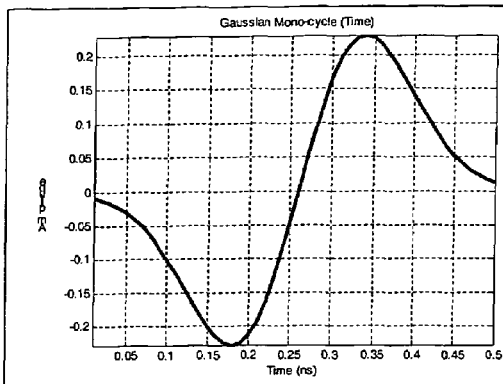
FIGS. 11 and 12 show respectively the second and third derivative of a Gaussian mono-cycle.
Figure 12:
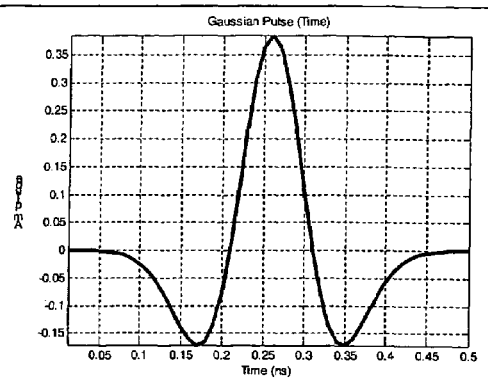
Figure 13:
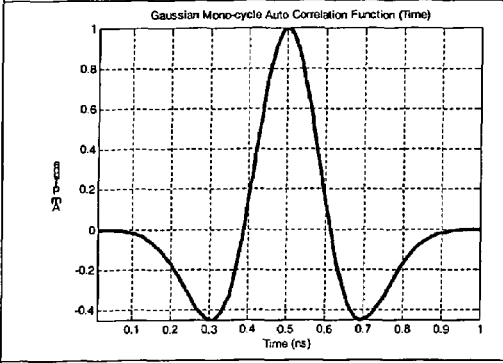
FIGS. 13 and 14 show respectively the auto-correlation of the second and third derivatives of a Gaussian mono-cycle shown in FIGS. 11 and 12 respectively.
Figure 14:
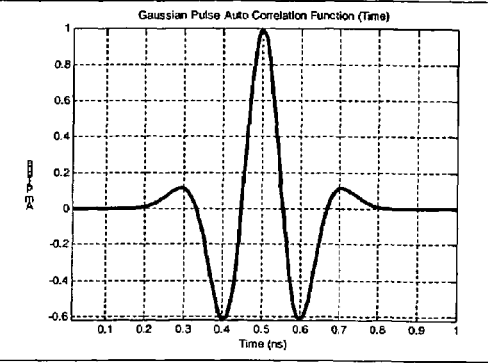

The receiver makes observations of the received signal using the front-end correlator. The output of the correlator is given by:

$$p(\gamma_{j_r,n_r,b}) = \left| \int_0^{T_w} r(t) w_{rx}(t + \gamma_{j_r,n_r,b}) dt \right| \quad (8)$$

where $w_{rx}(t)$ is the template waveform and $\gamma_{j_r,n_r,b}$ is a delay value where $j_r$ denotes the super frame number of the observation, $n_r$ denotes the frame number and b the bin position within a frame. The template waveform is generated at the receiver and fed to the front-end correlator along with the received signal r(t). Example template waveforms are shown in FIG. 11 and FIG. 12. These are the second and third derivatives of a Gaussian mono-cycle respectively and the corresponding auto-correlation functions of these template waveforms are shown in FIG. 13 and FIG. 14 respectively.

When $\gamma_{j_r,n_r,b}$ is chosen such that $w_{rx}(t)$ overlaps a pulse in the received signal exactly, a peak is produced at the output of the correlator. During synchronization different values of $\gamma_{j_r,n_r,b}$ are tested and peak output values from the correlator are noted in an attempt to deduce the necessary timing required to receive the signal. The receiver can only make observations with reference to $n_r$ and $j_r$. Also, assuming that the receiver can make observation down to a time resolution of $T_b$, the receiver can know where within each frame the observation is being made. Hence the delays $\gamma_{j_r,n_r,b}$ can be given by:

$$\gamma_{j_r,n_r,b} = (j_r N_h + n_r) T_f + b T_b \quad (9)$$

Note that $0 \leq b < N_b$ and that $j_r$, $n_r$ and b are taken relative to the receivers idea of time. Which exact $\gamma_{j_r,n_r,b}$ values are observed by the receiver depends upon its front-end correlation resources. If it is not possible to observe every bin position in every frame, for example because of hardware constraints such as a limited number of TIC's, a scheme which considers multiple frames must be employed. Care must be taken when devising this scheme to make sure that certain observations are not missed. An example suitable multiple frame observation scheme is made by choosing values of $\gamma_{j_r,n_r,b}$ which satisfy:

$$\gamma_{j_r,n_r,b} = \gamma_{j_r,n_r,\mathrm{mod}\left(j_r, \frac{T_c}{T_b}\right)} \quad (10)$$

For example if $N_h = 16$ and $T_c/T_b = 8$ the useable $\gamma_{j_r,n_r,b}$ values for this scheme are $\gamma_{0,0,0}$, $\gamma_{0,1,0}$, $\gamma_{0,2,0}$, $\cdots$ $\gamma_{0,15,0}$, $\gamma_{1,0,1}$, $\gamma_{1,1,1}$, $\cdots$ $\gamma_{1,15,1}$, $\gamma_{2,0,2}$, $\gamma_{2,1,2}$, $\cdots$ $\gamma_{7,15,7}$, $\gamma_{8,0,0}$, $\gamma_{8,1,0}$, As already discussed one way of searching for the signal is to perform an exhaustive search by attempting to receive the signal for all the $N_h \times N_b$ combinations of $\Delta$ and $n_o$, whilst summing the output of the correlator, for an arbitrary number of frames, $N_s$. This can be easily achieved by choosing appropriate values of $\gamma_{j_r,n_r,b}$. The $\Delta$ and $n_o$ combination that produces the highest summed output from the correletor is the most likely combination required to receive the signal. This method can be effective, but requires $N_h \times N_b \times N_s$ observations which can lead to long synchronization times. The search method of the embodiment makes more use of each observation in terms of where it can fit into the $\Delta$ and $n_o$ space in an attempt to decrease the search time without significantly reducing the detection performance.

When making an observation, $p(\gamma_{j_r,n_r,b})$, it is possible to create a set of hypothesized values for $\Delta$ which correspond to every possible value of n (and ultimately $n_o$) that this single observation could belong to. There are $N_h$ of these possible hypotheses for each $p(\gamma_{j_r,n_r,b})$ observation. Sweeping b from 0 to $N_b$ gives us $N_b$ sets of the $N_h$ hypothesis which span the whole $N_h \times N_b$ search space. Hence it is possible to gain information about all of the $\Delta$ and $n_o$ combinations within the $N_h \times N_b$ search space in just $N_b$ observations.

The search will be conducted by maintaining a $N_h \times N_b$ store in memory which contains an element for each $\Delta$ and $n_o$ combination. The correlator outputs $p(\gamma_{j_r,n_r,b})$ are placed in the appropriate elements of memory based on the proposed algorithm. Note that the $p(\gamma_{j_r,n_r,b})$ values are summed into the appropriate memory locations, using a read modify write operations, so that observations can be integrated to achieve the required processing gain.

To determine which $N_h$ memory elements can be updated for each observation one hypothesizes using the question:

'If a pulse was found here, which $\Delta$ and n combinations could have caused a pulse to be found in this position?'

Note that this question is asked regardless of whether a peak is found at the output of the correlator. In an alternative arrangement however, just the TIC peaks might be processed. This is possible in low noise environments, however the observations at every $\Delta$ and n combination is preferred in order not to miss pulses in noisy environments. Also note that the value n is mentioned in the question rather than $n_o$. It is possible to answer the question using n and then to generalize to $n_o$ afterwards. The $N_h$ hypotheses for $\Delta$ deduced from an observation made at receive super frame $j_r$, receive frame $n_r$ and bin position b are denoted by $\Delta_{j_r,n_r,b,n}$. In words, $\Delta_{j_r,n_r,b,n}$ represents the time difference between the frame boundaries of the received signal and the arbitrary frame boundary maintained at the receiver if a pulse was received at time bin b and the transmitters frame number (code index) was n. Note that the $j_r$ and $n_r$ subscripts do not say anything about the context of the value but are used to specify when the observation was made.

Using equations (7) and (8) one can deduce that peaks will occur at the output of the correlator when:

$$\gamma_{j_r,n_r,b} = c_n T_c + (jN_h + n + j_o N_h + n_o) T_f + \Delta_{j_r,n_r,b,n} T_b \quad (11)$$

Using equations (9) and (11):

$$(j_r N_h + n_r) T_f + b T_b = c_n T_c + (jN_h + n + j_o N_h + n_o) T_f + \Delta_{j_r,n_r,b,n} T_b$$

Therefore $$\Delta_{j_r,n_r,b,n} = \frac{1}{T_b}(bT_b - c_n T_c - (jN_h + n + j_o N_h + n_o + j_r N_h + n_r) T_f)$$

and $$\Delta_{j_r,n_r,b,n} = b - c_n \frac{T_c}{T_b} - (jN_h + n + j_o N_h + n_o + j_r N_h + n_r) N_b$$

Since $T_f/T_b = N_b$.

We know that $0 \leq \Delta_{j_r,n_r,b,n} < N_b$ so any addition and subtraction by integer multiples of $N_b$ will have no affect. Therefore:

$$\Delta_{j_r,n_r,b,n} = \mathrm{mod}\!\left(b - c_n \frac{T_c}{T_b}, N_b\right)$$

This gives us a set of $N_h$ values for each possible transmit frame number, given that we are observing the output of the correlator at time bin b. However what would be extremely useful is a set of values, $\Delta_{j_r,n_r,b,n_o}$ which give a set of $N_h$ values, one for each possible code offset value $n_o$, given an observation at time bin b. $\Delta_{j_r,n_r,b,n_o}$ can be obtained by appreciating that $c_n$, the code index (frame number) to code value look up function, requires n and not $n_o$, and a conversion is therefore necessary. Now:

$$n_o = n - n_r \quad (12)$$
$$n = n_o + n_r \therefore$$

$$\Delta_{j_r,n_r,b,n_o} = \mathrm{mod}\!\left(b - c_{\mathrm{mod}(n_o+n_r,N_h)} \frac{T_c}{T_b}, N_b\right)$$

For convenience it is assumed that $n_o$ is a positive integer $\geq 0$. This assumption can be made without loss of generality due to the cyclic nature of the pseudo random code.

Note that care must be taken so that $0 \leq n_o + n_r < N_h$ hence the mod( ) operator on the subscript of c.

As an example lets say that an observation is taken at $\gamma_{3,4,7}$, i.e. $j_r=3$, $n_r=4$ and b=7 and we subsequently wish to obtain the $N_h$ values of $\Delta_{3,4,7,n_o}$, i.e. $\Delta_{3,4,7,0}, \Delta_{3,4,7,1}, \Delta_{3,4,7,2} \ldots \Delta_{3,4,7,N_h}$. These are obtained from:

$$\Delta_{3,4,7,0} = 7 - c_4 \frac{T_c}{T_b}$$

$$\Delta_{3,4,7,1} = 7 - c_5 \frac{T_c}{T_b}$$

$$\Delta_{3,4,7,2} = 7 - c_6 \frac{T_c}{T_b}$$

$$\Delta_{3,4,7,N_h} = 7 - c_{\mathrm{mod}(N_h+4,N_h)} \frac{T_c}{T_b}$$

As mentioned previously the search will be conducted by maintaining a $N_h \times N_b$ store in memory which contains an element for each $\Delta$ and $n_o$ combination. The correlator outputs $p(\gamma_{j_r,n_r,b})$ are placed in the appropriate elements of memory based on the algorithm. Note that the $p(\gamma_{j_r,n_r,b})$ values are summed into the appropriate memory locations, using a read modify write operations, so that observations can be integrated to achieve the required processing gain. Each $p(\gamma_{j_r,n_r,b})$ value corresponds to an observation characterized by unique values of $j_r$, $n_r$ and b. These values can be plugged straight into equation (12). The values $\Delta_{j_r,n_r,b,0}$ to $\Delta_{j_r,n_r,b,N_h}$ can be obtained by setting $n_o$ to 0, 1, 2, ..., $N_h$. The combinations of $n_o$ and the resulting $\Delta_{j_r,n_r,b,n_o}$ are used to address the appropriate memory location in the store and the $p(\gamma_{j_r,n_r,b})$ observation is summed in to it. This carries on until the search is terminated when the required processing gain has been fulfilled. The position of the maximum value in the finally updated table will correspond to the most likely $\Delta$ and $n_o$ combination, according to the algorithm, required to receive the signal.

Table 1 shows an example section of a $\Delta$ and $n_o$ store when the observation scheme of equation (10) is being used and the code in FIG. 16 is being employed. The section shown is for $0 \leq n_o < 7$ and $0 \leq \Delta < 4$ and the scheme has been in progress for 5 super frames, i.e. $0 \leq j_r < 4$. Each element shows which $p(\gamma_{j_r,n_r,b})$ observations are placed where in the table. The search scheme allows single observations to be placed in several places in the table. A few values within Table 1 have been highlighted in bold or underlined to show this.

If we now remove the restriction that there are no other users and no multi-path the algorithm will still work but the performance will be slightly degraded. The algorithm will attempt to pick out the largest multi-path component from within the Multiple Access Interference and noise.

The equation for $\gamma_{j_r,n_r,b}$, equation (9), can be used to defined every observable time instant based on a particular UWB IR signal structure and receiver time bin size. If every time bin can be observed every frame it is possible to fill up the $\Delta$ and $n_o$ array every frame. However, due to finite resources in the receiver it may not be possible to observe all combinations of $\gamma_{j_r,n_r,b}$. For example it may not be possible to observe every time bin every frame since it may not be practical to implement the number of correlators necessary to do this in the front-end of the receiver. This means that every element of the $\Delta$ and $n_o$ array can no longer be filled every frame and observations need to be intelligently taken across successive frames so that the observations made are sufficient to be able to fill up every element of the $\Delta$ and $n_o$ array as quickly as possible given the resources, with minimal duplications.

Two schemes for doing this are described below and each scheme can be scaled for different correlator resources which ultimately affect the search time. An equation for the number of frames required to completely fill up the Δ and $n_o$ array for each scheme is given. This value assumes no processing gain using frame integration and the value calculated therefore needs to be multiplied by the required processing gain to obtain the number of frames required to actually perform the search.

It may be useful to think of the observations schemes as a way examining chip synchronism. Looking at chip synchronism at the receiver there are $T_c/T_b$ time bin offsets to choose from, only one of which will be chip synchronous with the received signal. The observation schemes aim to ensure that each of the $T_c/T_b$ offsets are examined so that the proposed scheme is capable of providing the correct Δ and $n_o$ values for acceptable signal reception.

In a first arrangement (Scheme 1), the Δ and $n_o$ array can be filled up every time there have been observations made for $N_d$ consecutive frames at every bin in a contiguous block of $T_c/T_b$ bins. $N_d$ depends on the code structure and is the maximum distance between two code indexes which have the same chip value (wrapping if necessary). FIG. 17 to FIG. 19 illustrate some examples of $N_d$.

Thus for example, where a duration of a bin is a quarter of a chip (typical), then $T_c/T_b$ is 4 bins per frame over $N_d$ frames. Using this scheme any number of bins from 1 up to $T_c/T_b$ can be observed each frame. However in schemes which use less than $T_c/T_b$ observations simultaneously, the search has to be extended appropriately by further amounts of $N_d$ frames so that all observations are made such that the Δ and $n_o$ array can be completely filled. For example let's say $T_c/T_b=8$ and $N_b=64$. One could observe bins 12-19 for $N_d$ consecutive frames, or one could observe bins 12-14 for the first $N_d$ frames, bins 15-16 for the second Nd frames and bins 17-19 for the third Nd frames. Note that the absolute position of the bins is unimportant as long as observations from all the bins in a $T_c/T_b$ contiguous block of bins are made. Here the relationship between the number of correlations made per frame, $N_{corr}$, and the number of frames required to completely fill up the Δ and $n_o$ array for this scheme, $N_{fl}$, is given by:

$$N_{fl} = N_d \times \left\lceil \frac{T_c}{T_b N_{corr}} \right\rceil \quad (13)$$

Where $\lceil x \rceil$ denotes the 'ceiling' of x, i.e. the lowest integer greater than x, and $N_{corr}$ is an integer $1 \leq N_{corr} < T_c/T_b$.

An advantage of this arrangement is that it can scale down to one just correlator resource. However, all chip values need to be used within the pseudo random code. If not, some values in the Δ and $n_o$ array cannot be filled. Also it is constrained by the value of $N_d$ which is a property of the code being used. In the best case $N_d=N_c$ and in the worst case $N_d=N_b$.

This scheme is rather like testing the $T_c/T_b$ offsets in turn and observing them for $N_d$ frames. A pulse from the desired user will only be received when we are observing the bin which is chip synchronous with the received signal. Waiting for $N_d$ frames ensures that the pulse will be seen (at the correct, chip synchronous, bin) since every chip value is gauranteed to have arrived at least once within the $N_d$ duration.

Figure 21:
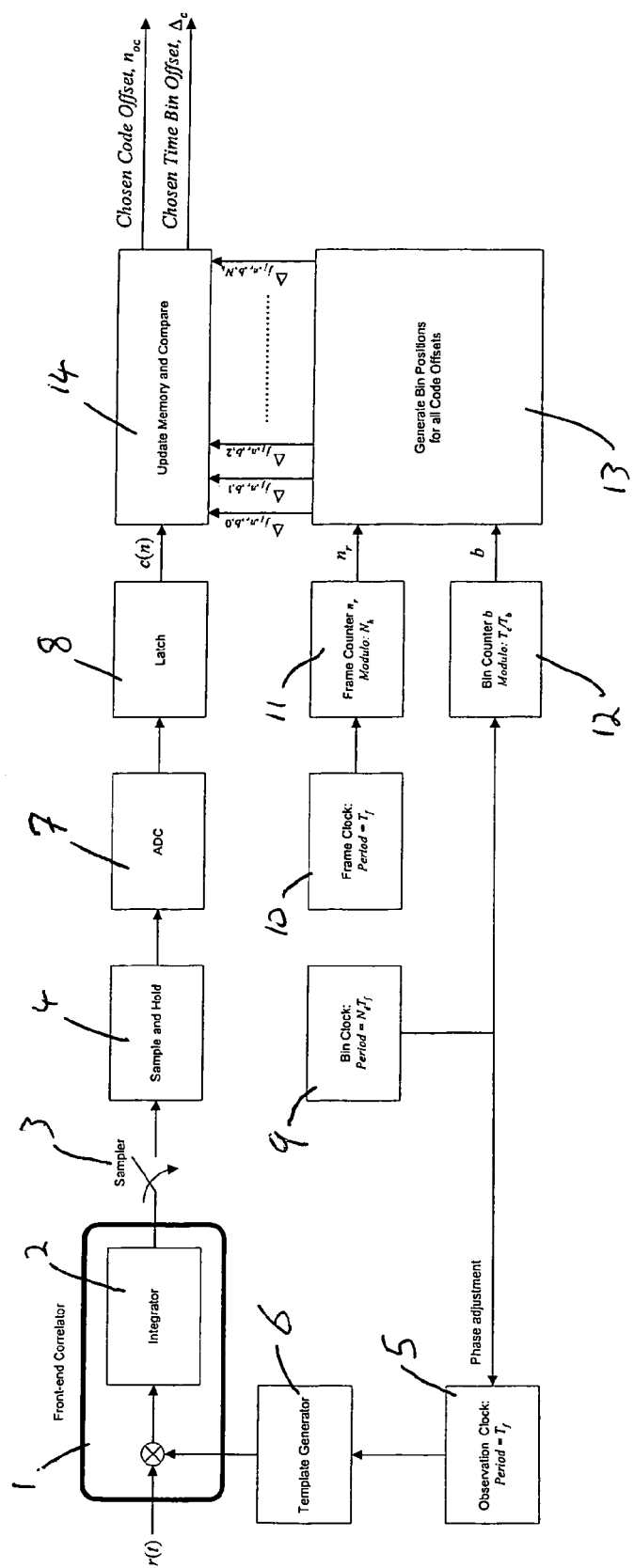
FIG. 21 shows an implementation architecture for scheme 1 and a single correlator.

FIG. 21 shows an exemplary implementation structure for the embodiment's UWB IR search algorithm. This system is based on the first Observation arrangement (Scheme 1) using one front-end correlator.

The front-end correlator (1, 2) accepts the input analogue signal r(t). The template reference signal is generated by the Clock 5 and Template Generator 6. The Template Generator is configured to produce an analogue pulse, which is as close as possible in shape to the pulses being received, each time it is triggered by the Observation Clock 5.

Each new observation is captured at the output of the Integrator 2 by the Sampler 3, Sample and Hold 4, ADC 7 and Latch 8 modules to create the discrete digital signal c(n).

The exemplary system aims to implement the search algorithm using Scheme 1 utilising one front-end correlator. In this example we wish to observe bin 0 for Nd frames, then bin 1 for a further $N_d$ frames then bin 2 etc. up to bin $(T_c/T_b)-1$. Once this has been carried out the Δ and $n_o$ array can be filled once. The process can then be repeated, summing in new values, for however many frames of integration are required to achieve a suitable level of accuracy.

In this system this observation scheme is achieved using a clock 5 which has a period of $T_f$ and whose phase can be changed by time increments equal to $T_b$ when triggered from a second clock (9). This block is labelled as the Observation Clock block 5 in FIG. 22. The Observation Clock 5 will trigger the Template Generator 6 every frame so that an observation is made at the same bin position every frame. This carries on until the Observation Clock 5 is triggered by the Bin Clock 9, which has a period of $N_d T_f$—that is the frame duration multiplied by the maximum number of frames between two code indexes which have the same chip value (wrapping if necessary), as explained above. The triggering signal from the Bin Clock causes a phase change in the Observation Clock 5 which is equivalent to a momentary delay by $T_b$ for the Observation Clock 5. The Observation Clock 5 then continues triggering the Template Generator 6 at regular frame intervals but it is now effectively triggering at the next bin along from before.

The Bin Clock 9 and Frame Clock 10 are used to update counters. The values of these counters are ultimately used to determine which value in the Δ and $n_o$ array needs to be updated for each observation. The Frame Clock 10 has a period of $T_f$ and this remains fixed. This is used to update the Frame Counter 11 which maintains the value of the receivers frame number $n_r$. The Bin Clock 9 triggers the Bin Counter 12 which keeps a count of the bin offset b which is currently under observation. The Generate Bin Positions for all Code Offsets block 13 uses the values for $n_r$ and b and carries out the implementation of equation (12) to generate the $\Delta_{j_r,n_r,b,n_o}$ values for the algorithm.

The Update Memory and Compare 14 stage takes the discrete signal c(n) plus the bin addresses $\Delta_{j_r,n_r,b,0}$ to $\Delta_{j_r,n_r,b,N_h}$ and updates the Δ and $n_o$ array by adding the new value to the ones stored in the appropriate memory locations. It also keeps a track of the maximum value obtained so far for each code offset plus its bin position (the bin position of the max values can be deduced from the $\Delta_{j_r,n_r,b,n_o}$ values). The update memory and compare module 14 is described in more detail further below.

Once the search has been completed the stored maximum values are used to determine the most likely code offset and bin position, $\Delta_c$ and $n_{oc}$, which can be used to synchronize to the received signal.

Whilst not shown in FIG. 21, there is also a connection from the Observation Clock module 5 to clear the Integrators memory 2 prior to each observation. The system may be implemented using a combination of analogue hardware, FPGA and/or ASIC digital processing, DSP software plus any other possible implementation mechanisms using any practical and feasible partitioning.

Figure 22:
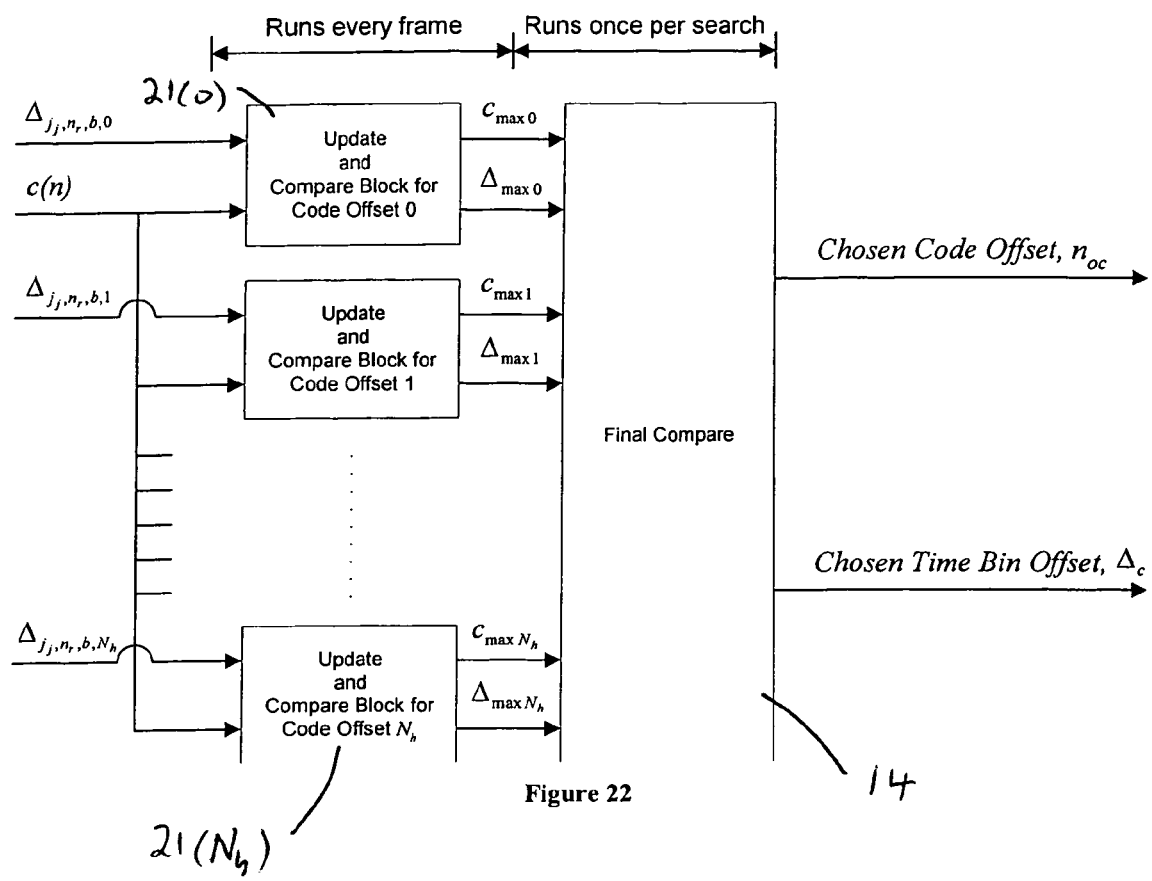
FIG. 22 shows the update memory and compare stage of FIG. 21 in more detail.

FIG. 22 shows an exemplary implementation for the Update Memory and Compare stage 14. Every frame there is a requirement to update $N_h$ memory locations in memory. FIG. 22 shows how the structure can be partitioned such that these memory updates can be performed in parallel. The memory can be partitioned into $N_h$ blocks ($21(0)$-$21(N_h)$) containing $N_b$ locations, one block for each code offset. Since one memory location in each code offset block needs to be updated every frame one can guarantee that no memory contention will occur since each block is independently addressable.

Individual Update and Compare Blocks $21(0)$-$21(N_h)$ run every frame and it is their job to update the relevant memory locations. For example the Update and Compare Block for Code $21(0)$ Offset $0$ shall take $\Delta_{j,n_r,b,0}$ and $c(n)$, and update the memory location pointed to by $\Delta_{j,n_r,b,0}$ by adding $c(n)$ to it. The Update and Compare blocks $21$ are also responsible for maintaining the current maximum value for the relevant Code Offset $n_o$, denoted by $c_{max,n_o}$, along with its corresponding bin position, $\Delta_{max,n_o}$. These values form the outputs of the individual Update and Compare Blocks.

The Final Compare module $22$ runs at the end of the search, once all observations have been gathered. It compares all of the $c_{max \times n_o}$ values with each other and finds the maximum value. The Code Offset that produces the maximum output forms the Chosen Code Offset output, $n_{oc}$, and its corresponding bin position value (given by the corresponding $\Delta_{max\ n_o}$ value) forms the Chosen Time Bin Offset value $\Delta_c$. $n_{oc}$ and $\Delta_c$ indicate the most likely Code Offset and Time Bin Offset values, according to the algorithm, that can be used to synchronise the receivers time reference to that of the received signal.

FIG. 23 shows a circuit arrangement similar to FIG. 21 but in which a number (K) of front end correlators are employed to increase the speed of the search. This is because multiple correlators allow more than one observation per frame.

K front-end correlators $1$ are employed along with the associated samplers $3$, sample and hold modules $4$, ADCs $7$ and latches $8$. Compared with FIG. 21, the Observation Clock module $5$ becomes the Observation Clocks Generator $25$ which produces K trigger signals, one for each front-end correlator, which stimulate K template generators (TG) which feed the K front-end correlators. The Bin Clock module $9$ becomes the Bin Generator $29$ which now generates K bin values rather than a single value. This module is still triggered at the same rate of $N_d T_f$. It outputs a $T_c/KT_b$ long sequence of K bin values such that all $T_c/T_b$ bin values in the $T_c/T_b$ contiguous block are included once, and only once, in the sequence. The Generate Bin Positions for all Code Offsets module $33$ now takes in K bin values, instead of only one, and outputs $KN_h$ bin positions rather than $N_h$. Thus there are $N_h$ outputs for each input $b_k$. The module works in exactly the same way as before, there are simply more inputs and more outputs.

Figure 24:
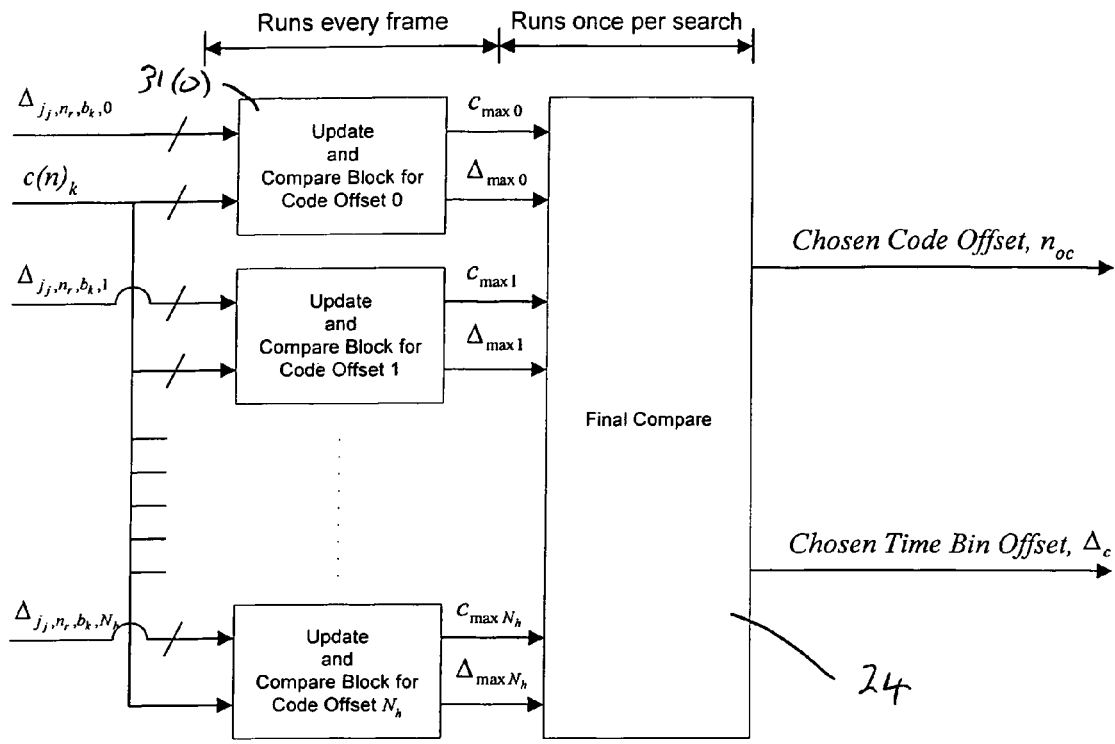
FIG. 24 shows the update memory and compare stage of FIG. 23 in more detail.

The Update Memory and Compare module $34$ now takes in K $c(n)$ values rather than one, and $KN_h$ bin position values rather than $N_h$. FIG. 24 illustrates the slight difference in the internal workings of the Update Memory and Compare Module $34$.

The Update and Compare Blocks now receive a bus of K bin position values and a bus of K latch output values. $\Delta_{j,n_r,b_k,0}$ represents the values $\Delta_{j,n_r,b_0,0}$ to $\Delta_{j,n_r,b_K,0}$ and $c(n)_k$ represents the values $c(n)_0$ to $c(n)_K$. Here the Update and Compare Block deals with updating all of the K memory locations in the code offset memory block with the appropriate $c(n)$ values. Note that due to the nature of the algorithm all of the bin positions will be unique so no attempt will ever be made to update the same location twice in one frame duration. This can therefore be realised using parallel operations.

A simple example is illustrated with reference to Table 2. In this example Tc=1 ns, Tb=62.5 ps and K=4. For scheme 1, one can search the whole search space one time by observing every bin in a block of contiguous Tc/Th bins for Nd frames each, where Nd is the maximum distance in frames between two identical code values in the time-hopping code. If one observation is allowed per frame the search will take NdTc/Th frames to complete, however with K correlators it is possible to make a time saving of a factor of K to NdTc/KTh frames. Assuming that the chosen contiguous block of bins is 0-15, with the K=4 scenario and a design as in FIG. 23, the search could be conducted as shown in Table 2. Each row of this table is employed for Nd frames before moving on to the next row; this is triggered by the Bin Clock $29$. The Observation Clock Generator $25$ is required to send the appropriate trigger signals, in accordance with the appropriate row of Table 2, every frame until it is triggered by the Bin Clock $29$ in which case it moves to the next row and uses the new trigger times. Note that when the Observation Clocks Generator and Bin Generator modules are using the final row of Table 2 they will revert to using the first row once triggered further by the Bin Clock module $29$. With the Observation Clocks Generator $25$ and Bin Generator modules $32$ behaving as in this table, and the remaining modules functioning as described above a system which implements scheme 1 with multiple correlators is realised. It is a straight forward matter to envisage extending the example design from 4 correlators $1$ to K correlators $1$.

For convenience Tc, Tb and K are preferably chosen such that Tc/Th is an integer and Tc/Th is a multiple of K.

A second arrangement (Scheme 2) looks at observing sets of $N_c$ bins simultaneously within a frame. One set in the context of this scheme consists of $N_c$ bins with each bin being separated by a number of bins equating to a $T_c$ duration. Within the frame there are $T_c/T_b$ such unique sets and the $\Delta$ and $n_o$ array can be filled up completely once all sets have been examined. One can examine any number of these sets per frame from 1 to $T_c/T_b$. When less than $T_c/T_b$ sets are examined simultaneously (perhaps due to a deficiency in correlator resources) the search is extended by the appropriate number of frames required so that all sets have been examined. The relationship between the number of correlations made per frame, $N_{corr}$, and the number of frames required to completely fill the $\Delta$ and $n_o$ array for this scheme, $N_{f2}$, is given by:

$$N_{f2} = \left\lceil \frac{T_c N_c}{T_b N_{corr}} \right\rceil \quad (14)$$

Where $\lceil x \rceil$ denotes the 'ceiling' of x, i.e. the lowest integer greater than x, and $N_{corr}$ is an integer which is a multiple of $N_c$ and $N_c \leq N_{corr} < N_c \times T_c/T_b$. Note that $N_c \times T_c/T_b = N_b$.

Advantages of this second arrangement are that all chip values do not need to be used within the code; and it is not constrained by $N_d$, if there are enough resources it is possible to fill up the $\Delta$ and $n_o$ array in one frame. However it is restricted to a minimum number of correlators of $N_c$ and the number of correlator must be a multiple of $N_c$. If $N_c$ is large then this may become impractical.

Like the first scheme (1) this scheme (2) is rather like testing the $T_c/T_b$ offsets in turn but instead of waiting for $N_d$ frames to ensure that a pulse arrives this scheme covers all of the possible chip positions simultaneously for each of the $T_c/T_b$ offsets. This ensures that, if the offset being examined is correct for chip synchronism a pulse will be observed in the frame. This technique allows the search time to be drastically reduced but requires more correlator resources to achieve it. Covering all chip values simultaneously also makes the observation scheme independent of the code structure.

FIG. 25 shows a circuit arrangement utilising a number of correlators 1 and analogous to that of FIG. 23, except that this is implemented for scheme 2 rather than scheme 1. Scheme 2 looks at observing sets of Nc bins simultaneously within a frame. One set in the context of this scheme consists of Nc bins with each bin being separated by a number of bins equating to a Tc duration. Within the frame there are Tc/Tb such unique sets and the $\Delta$ and no array can be filled up completely once all sets have been examined. The main differences between FIGS. 23 (scheme 1) and 25 (scheme 2) are as follows. The Bin Clock 39 period is Tf as Scheme 2 does not require observations for Nd frames. However it does require at least Nc correlators and the number of correlators, K, must be a multiple of Nc. The Bin Generator 42 now generates a NcTc/KTh length sequence of K bin position values. The collections of bin values will be in accordance with scheme 2 (see example below). The Observation Clocks Generator module 35 generates clock signals in accordance with scheme 2 (see example below). The remainder of the design functions as described previously.

An example is illustrated with reference to table 3. In this example Tf2 ns, Tc=1 ns, Tb=125 ps and K=2×Nc=4. the table shows a suitable template generator triggering times and bin generator output sequences for the Observation Clocks Generator 34 and Bin Generator modules 42 respectively. As before the Bin Clock 39 would trigger a transition through the rows of the table.

From table 3 it can be seen how the first row will trigger the template generators for bin positions 0, 16, 1 and 17. The logic contained within the Generate Bin Positions 42 for all Code Offsets and Update and Compare Memory modules will ensure that the correct observations go in the correct element in the $\Delta$ and no array. Progressing through the rows of table 3 shows that every bin is examined and since this is done in such a way to realise scheme 2 the $\Delta$ and no array can be fully populated after all rows have been observed.

Again it is best to choose Tc, Tb and K such the Tc/Th is an integer and that K is a multiple of Nc.

Note that the designs explained by FIGS. 23 and 25 show multiple correlators with one correlation being performed by each correlator per frame. However a fast correlator apparatus could be used immediately after it has performed a correlation. In this way more observations can be made per frame for the same number of correlators.

Using this scheme there is a minimum number of correlators that can be employed such that every time bin can be observed on every frame. This number depends on the pulse duration Tw and the bin time Th. One can fix Th to equal Tw/M where M is an integer and the minimum number of correlators is given by M. In the implementation the M correlators will be working substantially faster than a frame duration, performing the next correlation immediately after the current one has finished, and at a different time bin offset to all the other correlators. For example if Th=Tw/4 (four correlators) the first correlator could correlate against bins 0, 4, 8, 12, etc., the second at 1, 5, 9, 13, etc. the third at 2, 6, 10, 14, etc. and the fourth at 3, 7, 11, 15, etc. All of these correlations could be made every frame making it possible to observe every bin position every frame using a minimum number of correlators.

When the receiver is switched on it will not necessarily be frame synchronous with the received signal, in fact that is extremely unlikely. Hence the receiver's frames will straddle the received signals frames. This straddling effect can cause the algorithm to get 'confused' which it tries to determine the code offset, $n_o$. Normally this confusion will not generate errors, however the level of confusion increases as the receivers frames begin to straddle the received signals frames by factors approaching 50%, i.e. when the receiver 'sees' more or less equal contributions from two different frames of the received signal. This effect manifests itself in the results of the $\Delta$ and $n_o$ array by showing similar peaks at consecutive values of $n_o$. One of the code offsets will present the correct value, the other will present a 'confused' value. If the peaks are of similar magnitude (which may occur when the recever straddles the received signals frames by 50%) the maximum operator may pick the wrong offset resulting in a detection error. An easy way to mitigate this effect is for the algorithm to perform a short verification phase. The value for $\Delta$ will always be correct but the $n_o$ value found could be either $n_o$, $n_o+1$ or $n_o-1$. The verification phase merely tries the three alternatives, integrating the output of the correlator to obtain the required processing gain, and chooses the combination which produces the peak output.

The search is terminated when observations have been made for the appropriate number of frames such that every element in the $\Delta$ and $n_o$ array has had enough correlator output values summed into it to fulfil the desired processing gain. For example if we are using the first Observation Scheme (1) with $N_{fi}=16$ and a processing gain of 5 a decision will be made on the search, i.e. the max operator used on the $\Delta$ and $n_o$ array, after 16×5=80 frames of observation. The processing gain can thus be used as a variable parameter for the search method. For example it may be desirable to initially make a noise measurement and use the measurement to determine a suitable processing gain value for the search. It may also be desirable to modulate a known data pattern on to the UWB IR signal to aid the search termination process. For example one may wish to employ an iterative approach where an initial process gain value is tried and an attempt is made to read the fixed training pattern after the above-described verification process has been carried out. If the training sequence is not found, a higher processing gain value can be tried and the process repeated until either the training sequence is found, or a maximum processing gain value is reached. In the latter case it is decided that the signal cannot be found. Note that throughout the whole process the values in the $\Delta$ and $n_o$ array will never be cleared. At each decision phase, if it is decided that a higher processing gain is required, the integration of the values in the $\Delta$ and $n_o$ array is continued where it left off. Hence the only time penalty here is in the verification and training sequence reception phases.

There are certain code structures that will perform badly during synchronisation. These are codes that have a constant difference between adjacent code values. FIG. 20 shows such a code, the difference between adjacent code values (modulo $N_c$ (which is 8 here)) is always 5 in this case.

Confusion and ambiguities occur when examining different code offsets, $n_o$, since the absolute difference between the code value in the received signal and that of a particular $n_o$ is always constant. Normally when an incorrect code offset is being examined pulses from the desired user will be found but they will not sum coherently during the integration process since the code offset is incorrect and the code structure does not match. However when a code structure as described above is employed the spurious peaks found in the incorrect code offsets will sum coherently due to the constant fixed difference between adjacent code values causing the peaks to always occur in the same place. These will sum in exactly the same way as the results at the correct $\Delta$ and $n_o$. This causes the results for all code offsets to 'look' like they are correct since they all have similar peak values in them. The search algorithm cannot tell which is the 'real' code offset values and will therefore pick one randomly and detection performance degrades.

Figure 26:
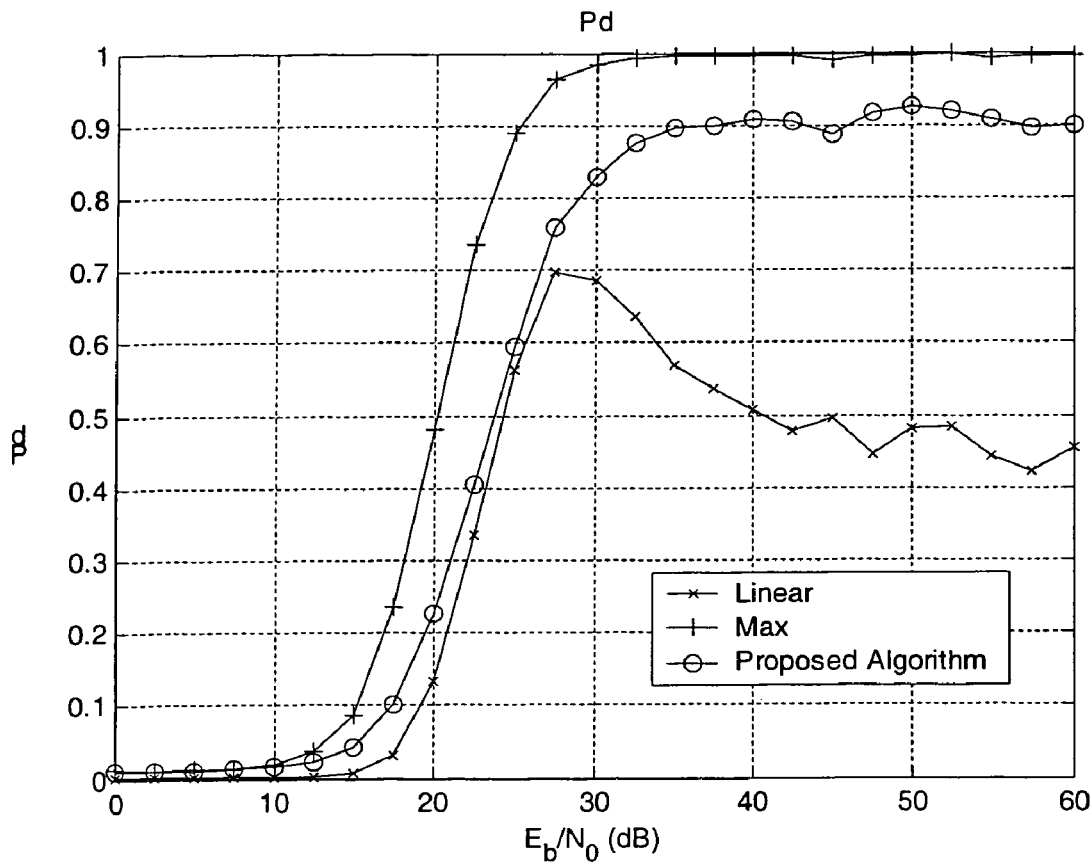
FIG. 26 shows simulation results for Probability of Detection $P_d$ versus $E_b/N_o$.

This effect causes problems for the proposed algorithm as well as the conventional thresholding algorithms and the best way to mitigate this effect is to not use codes of this structure during synchronization. FIG. 26 shows some results obtained when using such a 'bad' code.

Time is saved by appreciating the multiple interpretations of each pulse observation at the expense of lower performance. However the reduction in performance is acceptable. The period of time required to perform the proposed search is also fixed and is therefore predictable.

The embodiment can significantly decrease the time required to search for a UWB IR signal without a significant degradation in signal acquisition performance. A number of conventional search algorithms have a fluctuating search time which is governed by the particular scenario. However the search time for the embodiment is fixed, which is advantageous in wireless reception applications.

In addition, the implementation of the embodiment can be partitioned into analogue and digital sections where the digital section operates at a realistic sampling rate and parallelism can be employed.

It is possible to obtain more reliable performance by integrating the observed values for a number of frames. This has the effect of effectively increasing the SNR of the signal. In fact with conventional algorithms a certain amount of integration is essential because observations ambiguities are not taken into account. The embodiments appreciate these ambiguities and it is therefore possible to run it using no signal integration (the signal strength must be increased appropriately though). This makes it possible for the search time to be increased when using low SNR signals.

Simulation results are shown in FIGS. 26-29. The proposed algorithm is compared with two known algorithms.

The first of these is the Linear search method observes each time bin sequentially starting at the first bin position. Whilst examining each bin a number of observations are made (in accordance with the required processing gain) for each and every code offset before moving on to the next bin. The search is terminated at the first time bin and code offset position that produces a signal strength (after integration) which is above a calculated threshold, $\gamma$. Hence the time taken to perform the search is scenario specific. The threshold $\gamma$ is calculated based on a noise measurement.

The second known algorithm is the Maximum search method observes all of the time bins in turn, for all of the possible code offsets whilst employing the required processing gain (obtained by integrating correlator outputs). The time bin and code offset value which produces the maximum output is chosen to be the most likely time and code offset value required for signal acquisition. Here the search time is fixed and long since all time and code offset values are considered. However the method should provide the best performance for algorithms based on the amplitude of observations and therefore provides a good benchmark.

Parameters used during the simulations were:

$T_w$=0.5 ns $T_f$=100 ns $T_b$=97.7 ps (giving $N_{b=1024}$)

SIR=−12 dB

PG=12 dB (integrate over 16 frames)

K=26

$N_h$=16

$\gamma$=6.5 dB above the noise measurement

Number of runs per point=10,000

FIG. 26 shows results for the Probability of Detection ($P_d$) versus received energy (for each time and code offset observation; could include multiple pulses) ($E_b$) over noise spectral density ($N_0$). Note that the $E_b$ value take into account the processing gain due to integration being employed. FIG. 26 shows that the proposed method outperforms the linear method at $E_b/N_0$ values around and above the point where the max method (best case) curve flattens out. Note that the performance of the linear method decreases for high $E_b/N_0$ values. This is due to the fact that the linear search does not take into account any ambiguities in pulse observations. The effect of the ambiguities increases with $E_b/N_0$ and hence Pd falls. This effect flattens out at high $E_b/N_0$ values as the signal dominates over the noise.

Figure 27:
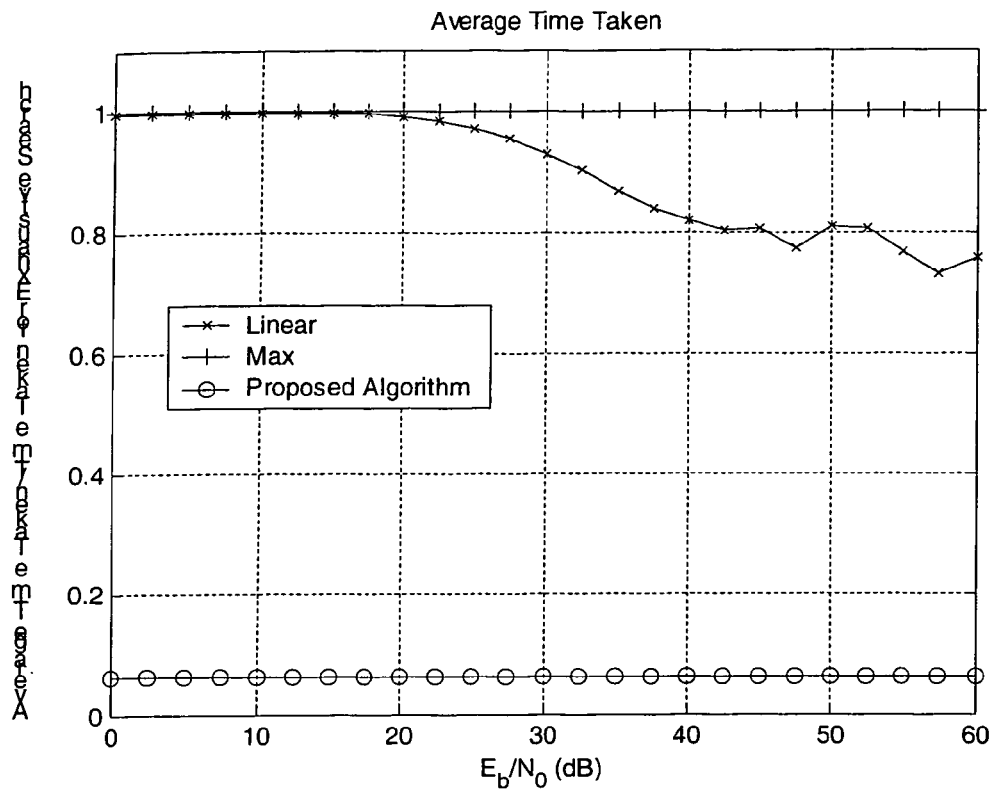
FIG. 27 shows simulation results for coverage time taken versus $E_b/N_o$.

FIG. 27 shows the time taken to perform the search divided by the time taken to perform the exhaustive search. It shows that at high $E_b/N_0$ values the Linear search algorithm can cut the time taken to about 25% of the exhaustive search (but at reduced performance). However although the average time decreases the instantaneous time taken to perform the search can still be above or below this value and is hard to predict. The proposed algorithm cuts the search time down to 6.25% of the exhaustive search time and the search time is fixed and therefore predictable. Note that the saving in the search time is a factor of the code length, $N_h$, the longer the code the greater the saving.

Figure 28:
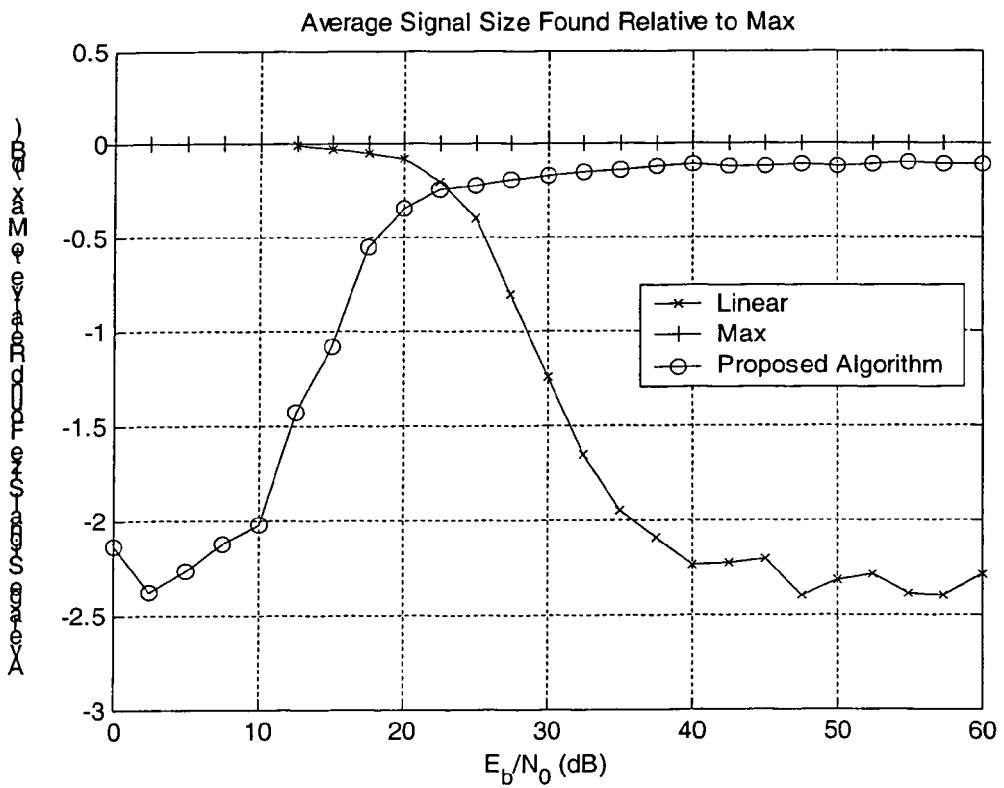
FIG. 28 shows simulation results for the average signal size found relative to the maximum value versus $E_b/N_o$.

FIG. 28 shows the amplitude of the signal found (in the cases when the signal was detected) relative to the size of the maximum signal value that could be found. The ability of the signal acquisition scheme to detect the largest signal multipath component may be advantageous. It shows that the amplitude of the signal found of proposed algorithm hovers around −0.15 dB of the maximum value when $E_b/N_0$ is above 20 dB and presents over a 2 dB advantage over the Linear search algorithms at high $E_b/N_0$ values. Note that the performance of the Linear search algorithm decreases at high $E_b/N_0$ values as explained above.

Figure 29:
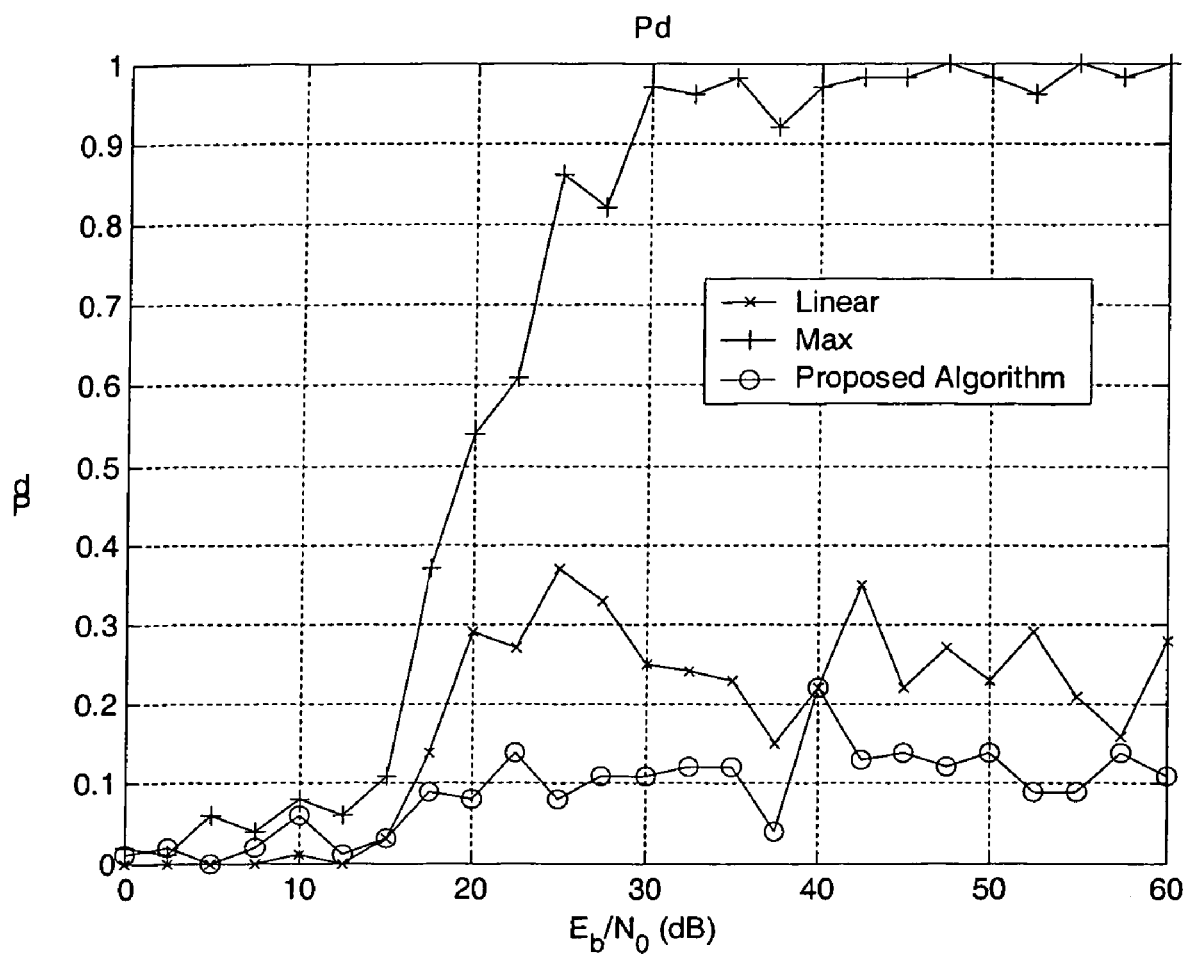
FIG. 29 shows simulation results illustrating the degradation in performance using "bad" codes.

The graph shown in FIG. 29 shows simulation results obtained when using a so called 'bad' code as discussed previously. Note that for these results $N_c$=$N_h$=8 was used and also note that 100 runs were used per point. It can be seen that the performance of the proposed method reaches a maximum $P_d$ of 12.5% at high $E_b/N_0$ values, i.e. the maximum $P_d$ achievable is 1/$N_h$ since all code offsets present equal maxima. The thresholding algorithms enjoy a slightly better performance since they do not always search the whole space and may therefore 'stumble' upon the correct detection point slightly more often. However it is conclusive that both approaches suffer significantly when using a 'bad' code.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analog array or similar device in order to configure analog hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. An apparatus for synchronising a receiver to a received UWB signal having a known hopping code, the apparatus comprising:
a determinor arranged to determine a parameter of the signal in a number of time slots;
an adder arranged to add the parameter associated with each time slot to a number of corresponding time and code offset accumulators; and
a selector arranged to select a time and code offset accumulator having an accumulated value corresponding to a predetermined accumulator metric, to provide the code and time offset required to synchronise the receiver.

2. An apparatus according to claim 1 wherein the predetermined accumulator metric is the largest value.

3. An apparatus according to claim 1 wherein the determiner comprises a template signal generator for providing a template signal at a second time offset, and a correlator to correlate said template signal with said received signal in order to provide said parameter.

4. An apparatus according to claim 1, wherein the number of accumulations corresponding to each time slot is two or more for all time slots.

5. An apparatus according to claim 4 wherein the number of accumulations corresponding to each time slot is equal to the code length.

6. An apparatus according to claim 1 wherein the UWB signal comprises a series of pulses transmitted over a corresponding series of time frames, the relative position of the pulse in each transmitter time frame being determined according to the hopping code; and wherein the apparatus comprises two or more parameter determiners corresponding to two or more time slots in a frame.

7. An apparatus according to claim 1 wherein the apparatus comprises one parameter determinor for each time slot.

8. An apparatus according to claim 1 wherein the UWB signal comprises a series of pulses transmitted over a corresponding series of time frames, the relative position of the pulse in each transmitter time frame being determined according to the hopping code; and wherein the apparatus comprises one or more parameter determinors corresponding to one or more time slots in a frame, and an adjustor to adjust the time slot in each frame for the or each said parameter determining means.

9. An apparatus according to claim 1 wherein the corresponding accumulators are determined according to:

$$\Delta_{j_r,n_r,b,n_o} = \mathrm{mod}\left(b - c_{\mathrm{mod}(n_o+n_r,N_h)}\frac{T_c}{T_b}, N_b\right).$$

10. An apparatus according to claim 1 wherein the accumulators are individually addressed memory locations.

11. An apparatus according to claim 1, further comprising:
a verifier arranged to determine the frame offset and code offsets having N accumulated parameter values according to a predetermined verification metric;
a parameter determiner arranged to determine said parameter of a signal corresponding to said received signal but generated according to the time and code offset associated with each of said N accumulator values;
an offset selector arranged to select one of said N time and code offsets according to said corresponding parameter.

12. An apparatus according to claim 11 wherein the verification metric is selected from the group consisting of: the highest accumulator values, and the one highest accumulator value and the accumulator values associated with a range of time slots on either side of said highest value.

13. An apparatus according to claim 11 wherein said offset selector is arranged to select the highest parameter.

14. An apparatus according to claim 11 wherein the parameter is the correlation of the generated signal with the received signal.

15. An apparatus according to claim 1 further comprising a terminator arranged to attempt to determine a training sequence modulated onto the received signal following said synchronisation, and if unsuccessful further determining said parameter for further time in order to provide an improved estimate.

16. An apparatus according to claim 1 wherein the UWB signal comprises a series of pulses transmitted over a corresponding series of time frames, the relative position of the pulse in each transmitter time frame according to the hopping code; and wherein said determinor is arranged to determine said parameter for one or more time slot per frame.

17. An apparatus for synchronising a receiver to a received UWB signal having a selected pseudo random hopping code having a fixed length $N_h$, wherein the UWB signal comprises a series of pulses transmitted over a corresponding series of transmitter time frames, the relative position of the pulse in each transmitter time frame is one of $N_c$ time slots relative to the time frame start and is governed according to the hopping code; and wherein the time hopping code is selected such that all $N_c$ slots are stimulated one or more times.

18. An apparatus according to claim 17 wherein the time hopping code further ensures that the numerical difference modulo $N_c$ between consecutive hop code values is always unique for the entirety of the code except the numerical difference between the last and first code value.

19. An apparatus according to claim 17 wherein the maximum distance, in terms of the number of frames, between any numerically identical code values within the code structure is equal to $N_c$ frame durations.

20. An apparatus according to claim 17 wherein the apparatus comprises:
a determiner arranged to determine a parameter of the signal in a number of time slots;
an adder arranged to add the parameter associated with each time slot to a number of corresponding time and code offset accumulators; and
a selector arranged to select a time and code offset accumulator having an accumulated value corresponding to a predetermined accumulator metric, to provide the code and time offset required to synchronise the receiver.

21. An apparatus for transmitting a UWB signal having a selected pseudo random hopping code having a fixed length $N_h$, wherein the UWB signal comprises a series of pulses transmitted over a corresponding series of transmitter time frames, the relative position of the pulse in each transmitter time frame is one of $N_c$ time slots relative to the time frame start and is governed according to the hopping code; and wherein the time hopping code is selected such that all $N_c$ time slots are stimulated one or more times.

22. An apparatus according to claim 21 the time hopping code further ensures that the numerical difference modulo $N_c$ between consecutive hop code values is always unique for the entirety of the code except the numerical difference between the last and first code value.

23. An apparatus according to claim 21 wherein the maximum distance, in terms of the number of frames, between any numerically identical code values within the code structure is equal to $N_c$ frame durations.

24. A method for synchronising a receiver to a received UWB signal having a known hopping code, the method comprising:
 determining a parameter of the signal in a number of time slots;
 adding the parameter associated with each time slot to a number of corresponding of time and code offset accumulators;
 determining the code and time offset accumulator having an accumulated value according to a predetermined accumulator metric as the code and time offset required to synchronise the receiver.

25. A computer readable medium incorporating computer readable code which when executed on a computer implement a method according to claim 24.

26. An apparatus for synchronising a receiver to a received UWB signal having a known hopping code, the apparatus comprising:
 means for determining a parameter of the signal in a number of time slots;
 means for adding the parameter associated with each time slot to a number of corresponding of time and code offset accumulators; and
 means for determining the time and code offset accumulator having an accumulated value according to a predetermined accumulator metric as the code and time offset required to synchronise the receiver.

* * * * *